(12) United States Patent
Kumetani

(10) Patent No.: US 10,657,849 B2
(45) Date of Patent: May 19, 2020

(54) CONTENTS DISPLAY APPARATUS, CONTENTS DISPLAY METHOD, AND CONTENTS DISPLAY SYSTEM

(71) Applicant: Sharp Kabushiki Kaisha, Sakai, Osaka (JP)

(72) Inventor: Kohji Kumetani, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 59 days.

(21) Appl. No.: 15/945,760

(22) Filed: Apr. 5, 2018

(65) Prior Publication Data

US 2018/0301069 A1 Oct. 18, 2018

(30) Foreign Application Priority Data

Apr. 14, 2017 (JP) ................. 2017-080650

(51) Int. Cl.
| | | |
|---|---|---|
| *G09F 9/30* | (2006.01) | |
| *H04H 20/14* | (2008.01) | |
| *H04N 21/414* | (2011.01) | |
| *H04N 21/835* | (2011.01) | |
| *H04N 21/4425* | (2011.01) | |
| *H04N 21/433* | (2011.01) | |
| *H04N 21/81* | (2011.01) | |
| *H04H 60/31* | (2008.01) | |
| *H04H 60/76* | (2008.01) | |
| *G09F 9/00* | (2006.01) | |

(52) U.S. Cl.
CPC ............... *G09F 9/30* (2013.01); *H04H 20/14* (2013.01); *H04H 60/31* (2013.01); *H04H 60/76* (2013.01); *H04N 21/41415* (2013.01); *H04N 21/4331* (2013.01); *H04N 21/4425* (2013.01); *H04N 21/812* (2013.01); *H04N 21/835* (2013.01)

(58) Field of Classification Search
CPC ....... G06K 9/00; H06N 21/262; H01R 43/048
See application file for complete search history.

(56) References Cited

U.S. PATENT DOCUMENTS

| | | | | |
|---|---|---|---|---|
| 2003/0018896 | A1 | 1/2003 | Aoshima et al. | |
| 2010/0042505 | A1* | 2/2010 | Straus | G06Q 30/02 705/14.73 |
| 2016/0070959 | A1* | 3/2016 | Sugama | G06K 9/00369 345/619 |

(Continued)

FOREIGN PATENT DOCUMENTS

| | | |
|---|---|---|
| JP | 2004-110645 A | 4/2004 |
| JP | 2009-158091 A | 7/2009 |

*Primary Examiner* — Getente A Yimer
(74) *Attorney, Agent, or Firm* — Keating & Bennett, LLP

(57) ABSTRACT

There is provided a contents display apparatus capable of receiving signage data including contents from a contents management apparatus, the contents display apparatus including: an alternative contents storage unit which receives alternative contents from the contents management apparatus and stores the alternative contents; an acknowledgement unit which causes the contents management apparatus to acknowledge validity of the signage data; and a contents display unit which displays contents based on the signage data in a case where the validity of the signage data is acknowledged by the acknowledgement unit and displays the alternative contents in other cases.

11 Claims, 19 Drawing Sheets

(56) References Cited

U.S. PATENT DOCUMENTS

| | | | |
|---|---|---|---|
| 2016/0094000 A1* | 3/2016 | Deck | G05B 15/02 29/753 |
| 2017/0366782 A1* | 12/2017 | Morita | H04N 7/147 |
| 2019/0034969 A1* | 1/2019 | Ishimura | H04L 67/2828 |
| 2019/0058912 A1* | 2/2019 | Sinohara | G06F 13/00 |
| 2019/0205935 A1* | 7/2019 | Albrecht | G06Q 30/0261 |

* cited by examiner

FIG. 3

| DISPLAY APPARATUS ID | DATE | TIME SCHEDULE NAME |
|---|---|---|
| Sig1 | APRIL 1, 2017 | TIME SCHEDULE FOR HOLIDAY (NEAR EXIT) |
| Sig1 | APRIL 2, 2017 | TIME SCHEDULE FOR HOLIDAY (NEAR EXIT) |
| Sig1 | APRIL 3, 2017 | TIME SCHEDULE FOR WEEKDAY (NEAR EXIT) |
| Sig2 | APRIL 1, 2017 | TIME SCHEDULE FOR HOLIDAY (PREMISES) |

FIG. 4

| TIME SCHEDULE NAME | TIME ZONE | PROGRAM NAME |
|---|---|---|
| TIME SCHEDULE FOR HOLIDAY (NEAR EXIT) | 08:00 TO 08:59 | TRAVEL CM1 |
| TIME SCHEDULE FOR HOLIDAY (NEAR EXIT) | 09:00 TO 09:59 | MOVIE CM1 |
| TIME SCHEDULE FOR HOLIDAY (NEAR EXIT) | 10:00 TO 10:59 | TRAVEL CM2 |
| TIME SCHEDULE FOR WEEKDAY (NEAR EXIT) | 08:00 TO 08:59 | CELLULAR PHONE CM1 |
| TIME SCHEDULE FOR WEEKDAY (NEAR EXIT) | 09:00 TO 09:59 | HOUSE CM1 |
| TIME SCHEDULE FOR WEEKDAY (NEAR EXIT) | 10:00 TO 10:59 | CELLULAR PHONE CM2 |
| TIME SCHEDULE FOR HOLIDAY (PREMISES) | 08:00 TO 08:59 | RESTAURANT CM1 |
| TIME SCHEDULE FOR HOLIDAY (PREMISES) | 09:00 TO 09:59 | TRAVEL CM1 |
| TIME SCHEDULE FOR HOLIDAY (PREMISES) | 10:00 TO 10:59 | RESTAURANT CM2 |

| PROGRAM NAME | DISPLAY FRAME | CONTENTS INFORMATION |
|---|---|---|
| TRAVEL CM1 | DISPLAY FRAME 1 (0, 0) - (909, 1079) | CM1-MOVIE1.WMV<br>CM1-MOVIE2.WMV |
| | DISPLAY FRAME 2 (910, 0) - (1919, 1079) | CM1-PIC1.JPG (30 SECONDS)<br>CM1-PIC2.JPG (30 SECONDS) |
| MOVIE CM1 | DISPLAY FRAME 1 (0, 0) - (1919, 1079) | CM2-MOVIE.WMV |
| TRAVEL CM2 | DISPLAY FRAME 1 (0, 0) - (909, 1079) | CM3-MOVIE.WMV |
| | DISPLAY FRAME 2 (910, 0) - (1919, 1079) | CM3-TEASER.WMV<br>CM3-POSTER.JPG (30 SECONDS) |

FIG. 7

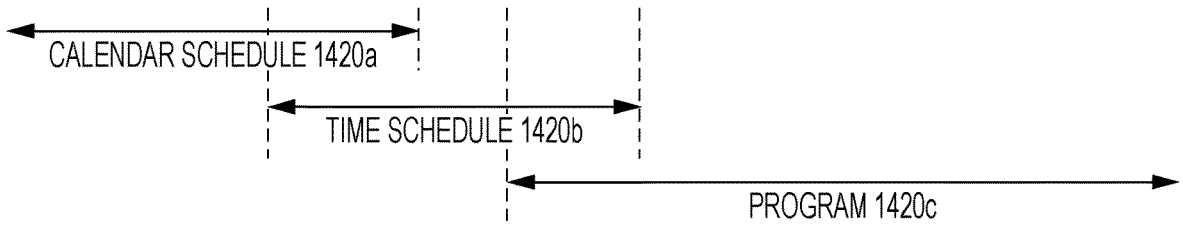

| DISPLAY APPARATUS ID | DATE | TIME SCHEDULE NAME | TIME ZONE | PROGRAM NAME | DISPLAY FRAME | CONTENTS INFORMATION |
|---|---|---|---|---|---|---|
| Sig1 | APRIL 1, 2017 | TIME SCHEDULE FOR HOLIDAY (NEAR EXIT) | 08:00 TO 08:59 | TRAVEL CM1 | DISPLAY FRAME 1 (0, 0) - (909, 1079) | CM1-MOVIE1.WMV CM1-MOVIE2.WMV |
| | | | | | DISPLAY FRAME 2 (910, 0) - (1919, 1079) | CM1-PIC1.JPG (30 SECONDS) CM1-PIC2.JPG (30 SECONDS) |
| | | | 09:00 TO 09:59 | MOVIE CM1 | DISPLAY FRAME 1 (0, 0) - (1919, 1079) | CM2-MOVIE.WMV |
| | | | 10:00 TO 10:59 | TRAVEL CM2 | DISPLAY FRAME 1 (0, 0) - (909, 1079) | CM3-MOVIE.WMV |
| | | | | | DISPLAY FRAME 2 (910, 0) - (1919, 1079) | CM3-TEASER.WMV CM3-POSTER.JPG (30 SECONDS) |

← CALENDAR SCHEDULE 1420a →

← TIME SCHEDULE 1420b →

← PROGRAM 1420c →

FIG. 13A

```xml
<?xml version="1.0" encoding="UTF-8"?>
<validationRequest>
  <requestId>sig1_123456789</requestId>
  <signageId>Sig1</signageId>
  <hash>
    <program name="TRAVEL C M 1">cccc</program>
    <content name="CM1-MOVIE1.WMV">ffff</content>
    <content name="CM1-MOVIE2.WMV">0123</content>
    <content name="CM1-PIC1.JPG">4567</content>
    <content name="CM1-PIC2.JPG">89ab</content>
  </hash>
</validationRequest>
```

FIG. 13B

```xml
<validationResult>
  <requestId>sig1_123456789</requestId>
  <hash>
    <program name="TRAVEL C M 1">valid</program>
    <content name="CM1-MOVIE1.WMV">valid</content>
    <content name="CM1-MOVIE2.WMV">valid</content>
    <content name="CM1-PIC1.JPG">valid</content>
    <content name="CM1-PIC2.JPG">invalid</content>
  </hash>
</validationRequest>
```

CONTENTS DISPLAY APPARATUS, CONTENTS DISPLAY METHOD, AND CONTENTS DISPLAY SYSTEM

BACKGROUND

1. Field

The present disclosure relates to a contents display apparatus, a contents display method, and a contents display system.

2. Description of the Related Art

In recent years, so-called digital signage, in which a display apparatus is disposed at a place where there are many people such as premises of a station or a shopping center and contents such as advertisements are displayed on the display apparatus, has been spread.

As an example of a business form of the digital signage, in general, a location owner (administrator) such as a railway operator or an operator of a shopping mall installs a digital signage system and sells advertising space to an advertiser who is a user of the digital signage.

Here, in operation of the digital signage, it is desirable that the contents to be displayed by the administrator are correctly displayed on the display apparatus of the digital signage without tampering. In order to realize this, it is effective to devise a device to avoid the tampering or to detect the tampering of the contents.

As the device to avoid the tampering, for example, a rewriting avoidance technology of a storage medium such as an enhanced write filter (EWF) and a file-based writer filter (FBWF) is used or ROMization of the storage medium is devised. In addition, in order to avoid an operation of the display apparatus performed by a third party, measures of covering terminals of the display apparatus with metallic covers are devised.

In addition, as a method of detecting the tampering of the contents, for example, Japanese Unexamined Patent Application Publication No. 2009-158091 discloses a technology in which a process of calculating a hash value of reproduction target content and determining whether or not the content is tampered with based on whether or not the calculated hash value is equal to a content hash registered in a content hash table recorded in an information recording medium is performed. In addition, Japanese Unexamined Patent Application Publication No. 2004-110645 discloses a technology in which a digital signature of a contents creator is verified based on warranty information attached to contents, for example, a public key cryptography and it is acknowledged whether or not the content is tampered with in a system which distributes the contents from a contents distributor to an unspecified number of receivers within a range of a specific region.

SUMMARY

It is desirable to appropriately change contents displayed on the display apparatus for a reason such as a contract with an advertiser in operation of the digital signage. Here, when storing contents data which is specific data of the contents to be displayed, it is not easy to use the rewriting avoidance technology which desires special operation of setting and releasing or to store the contents data in ROM which is not rewritable. In addition, due to characteristics of the digital signage, there are many cases where the system is installed at a position at which the third party can touch the system, so that a malicious third party easily connects another storage medium and tampers with the content data in the display apparatus. In order to avoid this, it may be possible to cover a terminal with a cover, but convenience and functionality on operation and maintenance may be lost and design property as an advertisement aircraft may also be lost. In addition, even if by checking a hash of the content data during distribution, validity is acknowledged during the distribution, in a case where the malicious third party changes the contents after the acknowledgement, there is a possibility that unintended contents are displayed. For these reasons, it is not possible to sufficiently devise the device to avoid wrong content display due to the tampering.

On the other hand, even if the tampering of the contents data is detected, after then, only not to display the contents data causes a so-called broadcasting accident situation of the digital signage. Therefore, it causes a problem that reliability of advertising equipment is damaged.

In view of above description, the present embodiment provides a contents display apparatus capable of appropriately displaying contents even if validity is not acknowledged when displaying the contents.

According to an aspect of the disclosure, there is provided a contents display apparatus capable of receiving signage data including contents from a contents management apparatus, the contents display apparatus including: an alternative contents storage unit which receives alternative contents from the contents management apparatus and stores the alternative contents; an acknowledgement unit which causes the contents management apparatus to acknowledge validity of the signage data; and a contents display unit which displays contents based on the signage data in a case where the validity of the signage data is acknowledged by the acknowledgement unit and displays the alternative contents in other cases.

According to another aspect of the disclosure, there is provided a contents display method capable of receiving signage data including contents from a contents management apparatus, the contents display method including: receiving alternative contents from the contents management apparatus and storing the alternative contents; causing the contents management apparatus to acknowledge validity of the signage data; and displaying contents based on the signage data in a case where the validity of the signage data is acknowledged by the acknowledgement unit and displaying the alternative contents in other cases.

According to still another aspect of the disclosure, there is provided a contents display system which includes a contents display apparatus capable of receiving signage data including contents from a contents management apparatus, in which the contents display apparatus receives alternative contents from the contents management apparatus and stores the alternative contents; causes the contents management apparatus to acknowledge validity of the signage data; and displays contents based on the signage data in a case where the validity of the signage data is acknowledged by the acknowledgement unit and displays the alternative contents in other cases.

BRIEF DESCRIPTION OF THE DRAWINGS

FIG. 3 is a diagram for explaining a calendar schedule which is a part of a contents display schedule according to the first embodiment;

FIG. 4 is a diagram for explaining a time schedule which is another part of the contents display schedule according to the first embodiment;

FIG. 7 is a diagram for explaining the contents display schedule according to the first embodiment;

FIGS. 13A and 13B are diagrams illustrating data included in a validity acknowledgement request signal and a validity response signal according to the first embodiment;

DESCRIPTION OF THE EMBODIMENTS

Hereinafter, embodiments according to the present disclosure will be described with reference to drawings. In the present embodiment, as an example, a digital signage system including a contents display apparatus according to the present disclosure will be described.

1. First Embodiment 1.1. Overall Configuration

Figure 1:
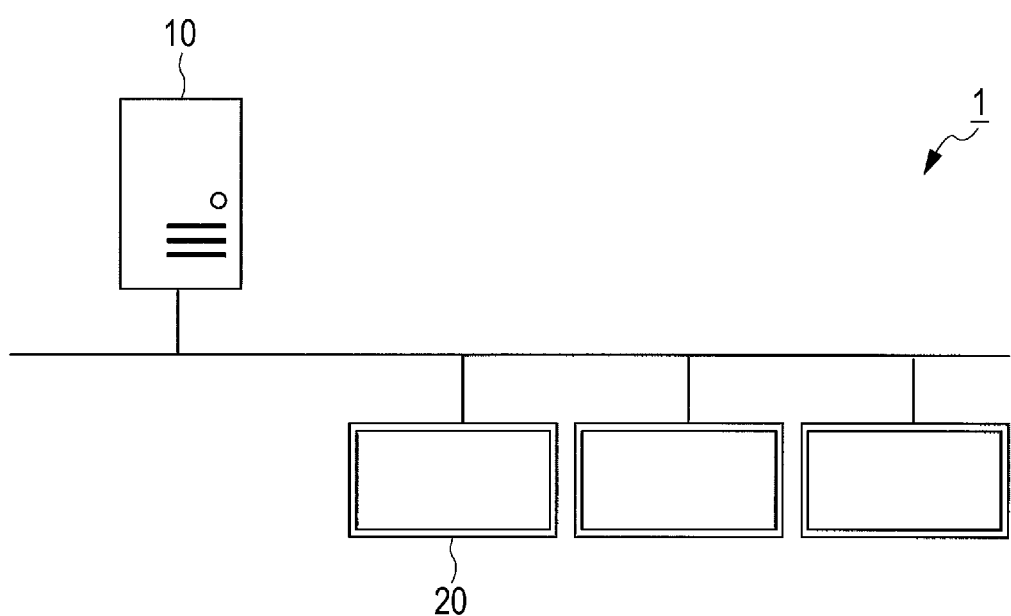
FIG. 1 is a diagram for explaining an outline of a digital signage system according to a first embodiment.

First, an overall configuration of a digital signage system 1 according to the present embodiment will be described based on FIG. 1. As illustrated in FIG. 1, in the digital signage system 1, a display apparatus 20 which is a contents display apparatus is connected to a management server 10 which is a contents management apparatus via a network. As illustrated in FIG. 1, a plurality of the display apparatuses 20 may be connected to the management server 10. In addition, the display apparatus 20 is connected to the management server 10 via the same network with the management server 10 in FIG. 1, but the display apparatus 20 may be connected to the management server 10 via an external network such as the internet.

1.2. Functional Configuration

Next, functional configurations of the management server 10 and the display apparatus 20 will be described.

1.2.1. Management Server

Figure 2:
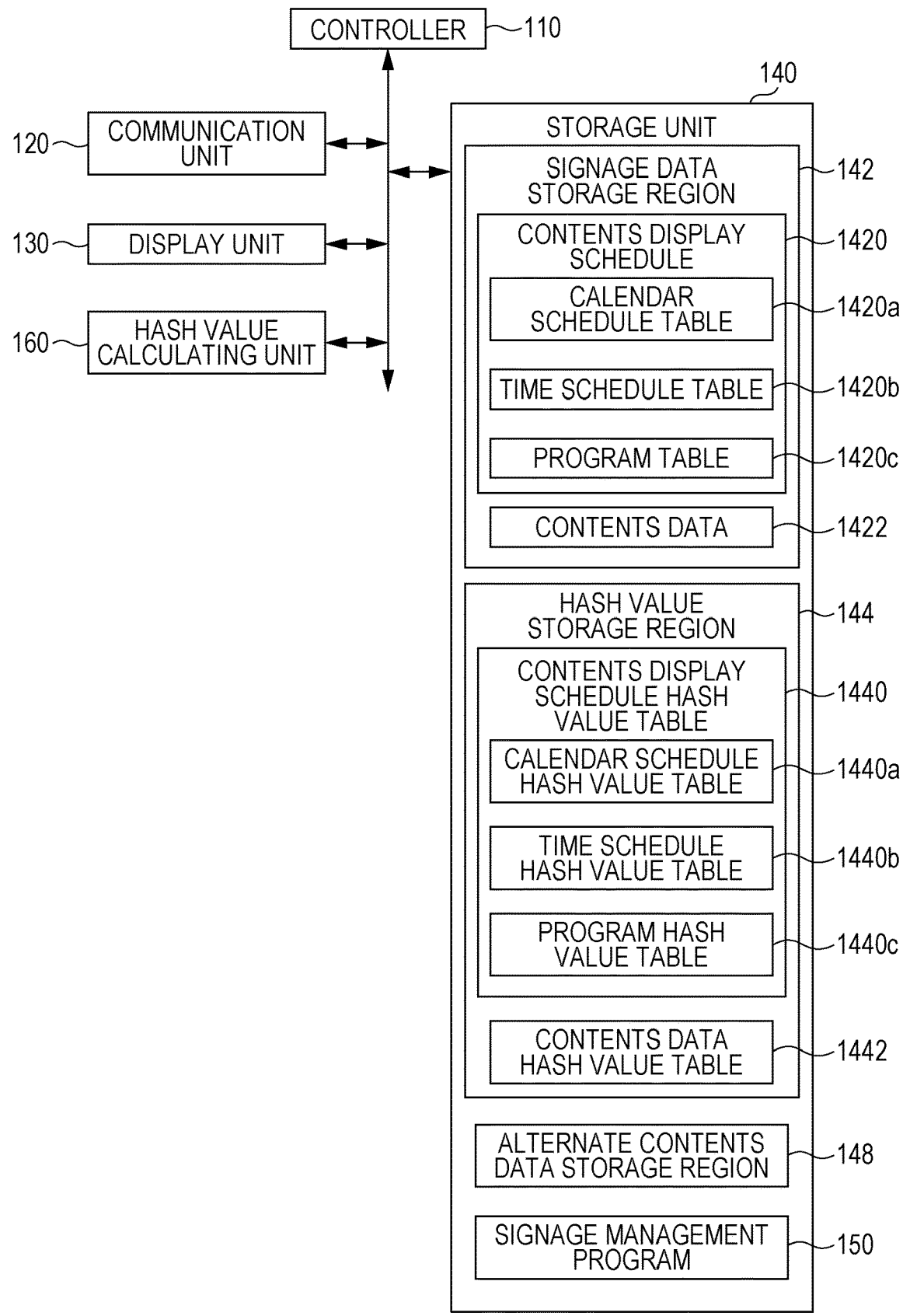
FIG. 2 is a diagram for explaining a functional configuration of a management server according to the first embodiment.

A functional configuration of the management server 10 will be described with reference to FIG. 2. The management server 10 is configured to include a controller 110, a communication unit 120, a display unit 130, a storage unit 140, and a hash value calculating unit 160.

The controller 110 is a functional unit which controls the overall management server 10. The controller 110 realizes various kinds of functions by reading and executing various kinds of programs stored in the storage unit 140 and is configured by, for example, a central processing unit (CPU).

The communication unit 120 is a functional unit which communicates with another device. For example, the communication unit 120 is a functional unit which can communicate by wire LAN or a functional unit which can communicate by wireless LAN As a communication scheme, Ethernet (registered trademark) or IEEE802.11a/b/g/n may be used and a communication network such as LTE (registered trademark) communication network or WiMAX (registered trademark) may also be used.

The display unit 130 is a functional unit which displays various information or displays a schedule preparation screen. For example, the display unit 130 is configured by a liquid crystal display (LCD), an organic EL display, a projector, and the like.

The storage unit 140 is a functional unit which stores various kinds of programs or various data desired for operation of the management server 10. The storage unit 140 is configured by, for example, a semiconductor memory, a hard disk drive (HDD), and the like.

Here, the storage unit 140 has a signage data storage region 142, a hash value storage region 144, and an alternative contents data storage region 148 and further stores a signage management program 150.

Hereinafter, data stored in the storage unit 140 will be described. The signage data storage region 142 is a region in which signage data is stored. The signage data of the present embodiment is data transmitted from the management server 10 to the display apparatus 20 and includes contents data and a contents display schedule which is a schedule for displaying the content data on the display apparatus 20.

Here, the signage data storage region 142 stores a contents display schedule 1420 which is a schedule for specifically displaying contents and contents data 1422 which is specific data of the contents displayed on the display apparatus 20. In addition, the contents display schedule 1420 is used to set which content is displayed on which terminal during which time zone and is configured by a calendar schedule table 1420a, a time schedule table 1420b, and a program table 1420c.

Next, the calendar schedule table 1420a will be described with reference to FIG. 3. The calendar schedule table 1420a stores a calendar schedule and stores, as an example, a display apparatus ID (for example, "Sig1") for identifying the display apparatus 20, a date designating a date for displaying contents (for example, "Apr. 1, 2017"), and a time schedule name which indicates a time schedule (for example, "time schedule for holiday (near exit)").

In addition, the calendar schedule assigns one time schedule to the display apparatus ID and the date. For example, it is possible to assign different time schedules for holidays and weekdays to the display apparatus 20 of which the display apparatus ID is "Sig1". In addition, even on the same date, it is possible to assign another time schedule to different display apparatuses 20. For example, in a case where the display apparatus 20 of which the display apparatus ID is "Sig1" is located near an exit of a building and the display apparatus 20 of which the display apparatus ID is "Sig2" is located in premises of the building, it is possible to assign another time schedule to each of the display apparatuses 20.

Next, the time schedule table 1420*b* will be described with reference to FIG. 4. The time schedule table 1420*b* stores a time schedule and stores, as an example, a time schedule name which indicates a time schedule (for example, "time schedule for holiday (near exit)"), a time zone (for example, "08:00 to 08:59"), and a program name (for example, "travel CM1").

That is, the time schedule is for setting one or a plurality of prescribed time zones in one day and assigning one program to the set time zone. Therefore, a plurality of programs are generally assigned to the time schedule, but only one program may be assigned to the time schedule.

Next, the program table 1420*c* will be described with reference to FIG. 5. The program table 1420*c* stores programs and stores a program name (for example, "travel CM1"), a display frame (for example, display frame 1 "(0, 0)-(909, 1079)"), and contents information (for example, "CM1-MOVIE1.WMV CM1-MOVIE2.WMV") assigned to the display frame.

That is, the program is for dividing a display region on which the display apparatus 20 displays the contents into one or a plurality of regions (hereinafter, referred to as "display frame") and assigning one or the plurality of the contents to each of the display frames.

In addition, in the contents display apparatus of the present embodiment, by setting a plurality of display frames, it is possible to display the plurality of the contents at the same time in a certain time zone. For example, as illustrated in FIG. 6, a display region of "(0, 0)-(1919, 1079)" is divided into two display regions (display frames) of the display frame 1 "(0, 0)-(909, 1079)" and a display frame 2 "(910, 0)-(1919, 1079)".

Figures 5, 6:
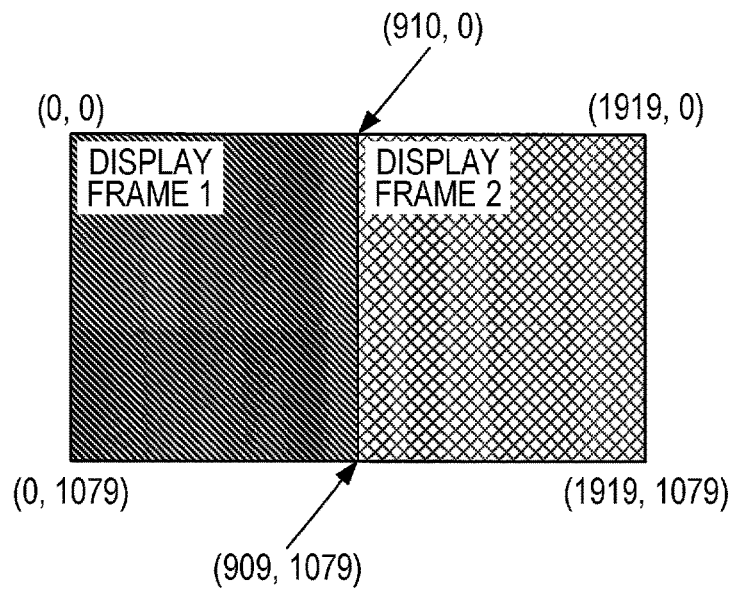
FIG. 5 is a diagram for explaining a program which is still another part of the contents display schedule according to the first embodiment.
FIG. 6 is a diagram for explaining a display frame according to the first embodiment.

For convenience of explanation, in the program table 1420*c* in FIG. 5, coordinates are stored as the display frame, but a setting table of the display frame may be separately stored. In this case, the program table 1420*c* may store information which specifies the display frame.

In addition, in the present embodiment, it is assumed that there are the plurality of the display frames in the display region, but it may be assumed that there is only one display region (that is, one display frame).

The contents information is information on contents distributed from the management server 10 to the display apparatus 20. The display apparatus 20 displays contents data on the display frame based on the contents information. As the contents information, for example, a file name of the contents data is stored. In addition, a display time of the contents data may also be stored together with file name.

One example of the contents display schedule 1420 will be described with reference to FIG. 7. The contents display schedule 1420 includes the calendar schedule table 1420*a*, the time schedule table 1420*b*, and the program table 1420*c*.

FIG. 7 illustrates the contents display schedule 1420 in which the calendar schedule table 1420*a*, the time schedule table 1420*b*, and the program table 1420*c* are combined with one another. In FIG. 7, the display apparatus 20 of which the display apparatus ID is "Sig1" displays contents based on the contents display schedule of "time schedule for holiday (near exit)" on "Apr. 1, 2017".

In addition, the time schedule illustrated in FIG. 7 includes three programs. In each of the programs, prescribed display frames and contents assigned to each of the display frames are designated. In this way, by setting the contents display schedule in multiple stages, it is possible to flexibly change the program or the time schedule.

The contents data 1422 is contents data which is a part of the signage data. The contents data is data which can be displayed on the display apparatus 20 and is included in the signage data distributed from the management server 10 to the display apparatus 20.

Here, the contents data is data which can be displayed on the display apparatus 20 and is, for example, a video or a still image. The video may be any of video formats such as an audio video interleave (avi file), a windows media video (wmv file), MPEG (mpg file), and the like. In addition, the still image may be any of image formats such as JPEG (jpg file), portable network graphics (png file), a graphics interchange format (gif file), and the like. In addition, audio data may be stored in combination with the still image. Besides, the contents data may also be text data.

The hash value storage region 144 is a region in which a contents display schedule hash value table 1440 and a contents data hash value table 1442 are stored. In addition, the contents display schedule hash value table 1440 includes a calendar schedule hash value table 1440*a*, a time schedule hash value table 1440*b*, and a program hash value table 1440*c*.

The hash value storage region 144 is a table in which a hash value which is a piece of validity acknowledgement information is stored. Specifically, based on the contents display schedule 1420, the hash value calculated by the hash value calculating unit 160 is stored in the contents display schedule hash value table 1440.

More specifically, the hash value calculated based on the calendar schedule stored in the calendar schedule table 1420*a* is stored in the calendar schedule hash value table 1440*a*. For example, if "aa00" is calculated as a hash value, the hash value is stored in association with the calendar schedule.

In the same manner, the hash value calculated based on the time schedule stored in the time schedule table 1420*b* is stored in the time schedule hash value table 1440*b* and the hash value calculated based on the program stored in the program table 1420*c* is stored in the program hash value table 1440*c*.

In addition, the hash value calculated based on the contents data 1422 is stored in the contents data hash value table 1442.

The alternative contents data storage region 148 includes a video or a still image as alternative contents data. Here, the alternative contents data is data displayed instead of the signage data in a case where validity of the signage data stored in the display apparatus 20 is not acknowledged. The alternative contents data is data such as the video or the still image which can be displayed on the display apparatus 20 and is transmitted from the management server 10 to the display apparatus 20.

The signage management program 150 is a program which realizes a signage management process by the controller 110 reading the program from the storage unit 140 and executing the program. In the signage management process, the contents data is registered, the contents display schedule is prepared, the signage data is distributed to the display apparatus 20, validity of the signage data is acknowledged, and the like.

The hash value calculating unit 160 is a functional unit for calculating a hash value corresponding to the input data. The hash value is obtained by using a hash function. Here, the hash function is a function for summarizing the given input data into data with a fixed length. As the hash function, any known method may be used. For example, MD5, SHA-2, SHA-3, or the like can be used.

1.2.2. Display Apparatus

Figure 8:
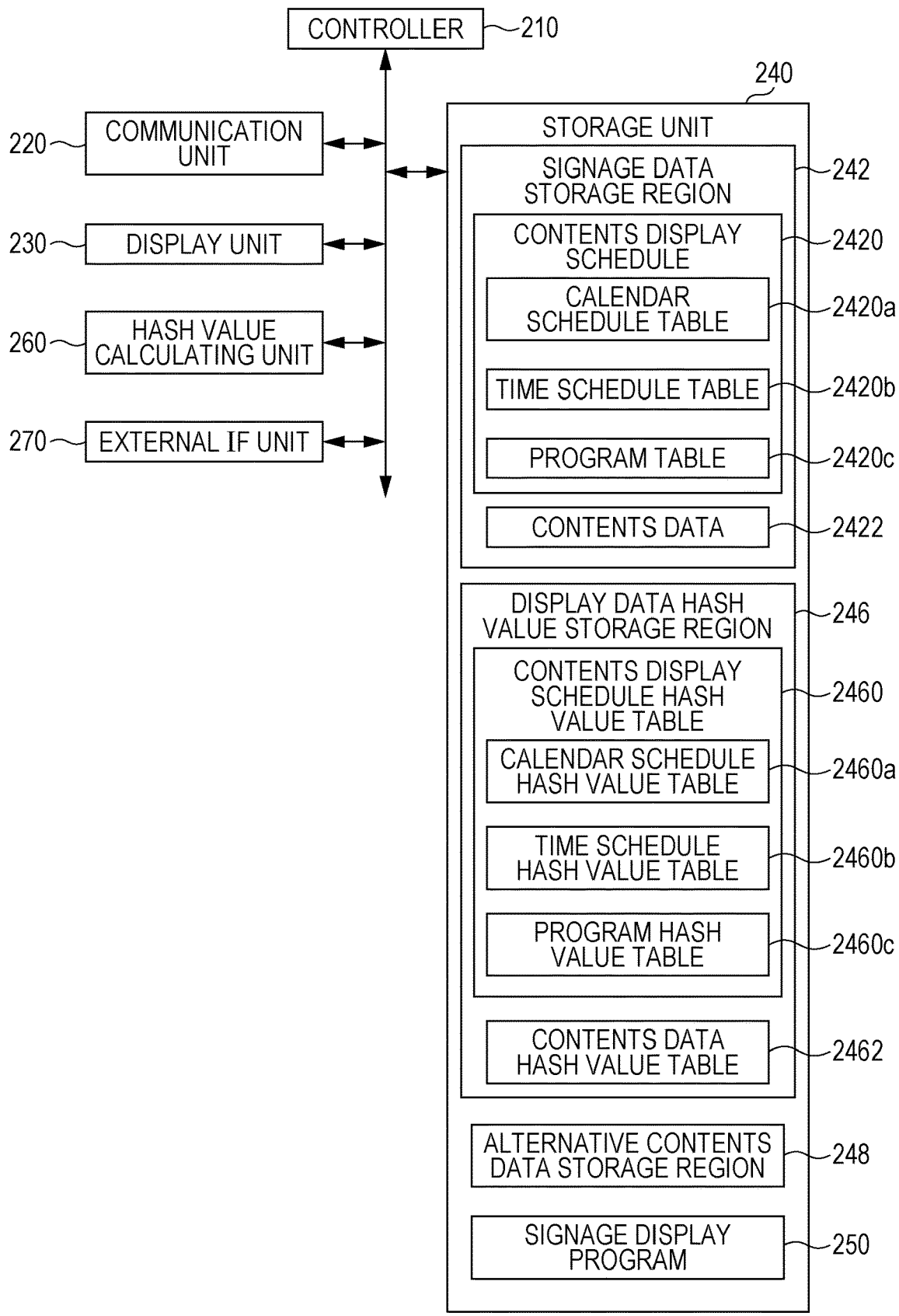
FIG. 8 is a diagram for explaining a functional configuration of a display apparatus according to the first embodiment.

A functional configuration of the display apparatus 20 will be described with reference to FIG. 8. The display apparatus 20 is an apparatus which actually performs a display at an installation location as the digital signage and includes a controller 210, a communication unit 220, a display unit 230, a storage unit 240, a hash value calculating unit 260, and an external IF (interface) unit 270.

The controller 210 is a functional unit which controls the overall display apparatus 20. The controller 210 realizes various kinds of functions by reading and executing various kinds of programs stored in the storage unit 240 and is configured by, for example, a central processing unit (CPU).

The communication unit 220 is a functional unit which mostly communicates with the management server 10. For example, the communication unit 220 is a functional unit which can communicate by wire LAN or a functional unit which can communicate by wireless LAN As a communication scheme, Ethernet or IEEE802.11a/b/g/n may be used and a communication network such as LTE communication network or WiMAX may also be used.

The display unit 230 is a functional unit which displays the contents data according to the contents display schedule. For example, the display unit 230 is configured by a liquid crystal display (LCD), an organic EL display, a projector, and the like.

The storage unit 240 is a functional unit which stores various kinds of programs or various data desired for operation of the display apparatus 20. The storage unit 240 is configured by, for example, a semiconductor memory, a hard disk drive (HDD), and the like.

The storage unit 240 has a signage data storage region 242, a display data hash value storage region 246, and an alternative contents data storage region 248 and further stores a signage display program 250.

The signage data storage region 242 is a region in which the signage data distributed from the management server 10 is stored. The signage data storage region 242 stores a contents display schedule 2420 and a contents data 2422.

The contents display schedule 2420 stores the contents display schedule 1420 transmitted from the management server 10. That is, respectively, the calendar schedule table 1420a is stored in a calendar schedule table 2420a, the time schedule table 1420b is stored in a time schedule table 2420b, and the program table 1420c is stored in a program table 2420c.

These contents display schedules 2420 are obtained by extracting the content display schedule corresponding to the display apparatus 20 in the management server 10, and a description of a data configuration will be omitted because the data configuration is described in the management apparatus.

The contents data 2422 is contents data which is distributed from the management server 10. The contents data also includes data displayed on the display apparatus 20 among the contents data stored in the management server 10. In addition, the alternative contents data storage region 248 also stores the alternative contents data distributed from the management server 10. If alternative contents are different from one another for each of the display apparatuses 20, the alternative content corresponding to each of the display apparatuses 20 among the alternative contents data stored in the management server 10 is transmitted. In addition, if the alternative contents are common to an overall system, the alternative contents data stored in the management server 10 are the same as the alternative contents data stored in the display apparatus 20.

The display data hash value storage region 246 is a region in which hash values calculated by the hash value calculating unit 260 are respectively stored. That is, the hash value of the contents display schedule 2420 is stored in a contents display schedule hash value table 2460.

Specifically, a hash value calculated based on the calendar schedule stored in the calendar schedule table 2420a is stored in a calendar schedule hash value table 2460a, a hash value calculated based on the time schedule stored in the time schedule table 2420b is stored in a time schedule hash value table 2460b, and a hash value calculated based on the program stored in the program table 2420c is stored in a program hash value table 2460c.

In addition, hash values corresponding to the contents data 2422 are respectively stored in a contents data hash value table 2462.

These hash values are hash values related to the signage data to be displayed on the display apparatus 20. In the present embodiment, these hash values are calculated before reproduction of the program and are stored in the display data hash value storage region 246.

The hash value calculating unit 260 is a functional unit for calculating a hash value corresponding to the input data. The hash value is obtained by using a hash function. Here, the hash function is a function for summarizing the given input data into data with a fixed length. As the hash function, any known method may be used. For example, MD5, SHA-1, SHA-256, or the like can be used.

In order to acknowledge validity of the signage data stored in the display apparatus 20, the hash value such as contents data is calculated and the calculated hash value is transmitted to the management server 10. Therefore, the hash function used by the hash value calculating unit 260 is the same as the hash function used by the hash value calculating unit 160 of the management server 10 so that validity is acknowledged in the management server 10.

The external IF unit 270 is an IF unit to which an external apparatus can be connected. For example, various apparatuses can be connected by a universal serial bus (USB). For example, a keyboard, a mouse, a USB memory, or the like can be connected for maintenance.

1.3. Flow of Process

Next, a flow of a process according to the present embodiment will be described.

1.3.1. Signage Management Process

Figure 9:
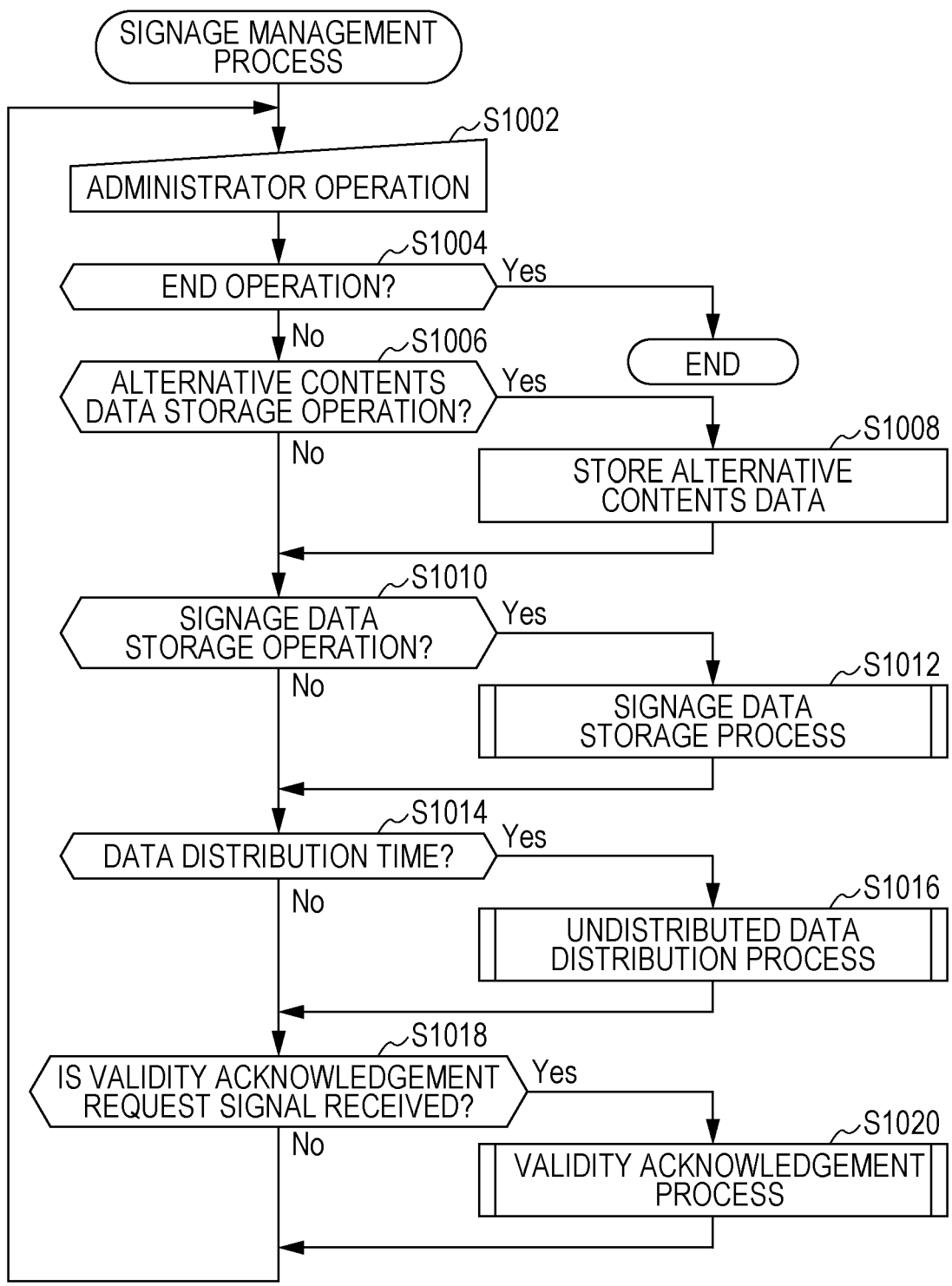
FIG. 9 is an operation flow for explaining a signage management process according to the first embodiment.

FIG. 9 is a flowchart for explaining a signage management process. The signage management process is realized by the controller 110 reading the signage management program 150 from the storage unit 140 and executing the signage management program 150.

First, when operation of an administrator is performed (Step S1002), it is determined what the operation is.

First, it is determined whether or not the operation is end operation (Step S1004). In a case where the operation is the end operation, the process is ended (Yes in Step S1004). The end operation may be an operation of turning off power supply or an operation of ending the program.

Next, it is determined whether or not the operation is alternative contents data storage operation (Step S1006). In a case of the alternative contents data storage operation, alternative contents data prepared in advance is stored in the alternative contents data storage region 148 (Yes in Step S1006→Step S1008). The stored alternative contents data may be, for example, contents data stored in another storage medium prepared by the administrator.

Further, it is determined whether or not the operation is signage data storage operation (Step S1010). In a case of the signage data storage operation, a signage data storage process is executed (Yes in Step S1010→Step S1012). The signage data storage process will be described below.

Next, it is determined whether or not it is time to distribute undistributed data from the management server 10 to the display apparatus 20 (Step S1014). Here, the undistributed data is contents data not distributed from the management server 10 to the display apparatus 20 among the signage data and the alternative contents data. When it is time to distribute the undistributed data, an undistributed data distribution process is performed (Yes in Step S1014→Step S1016). The undistributed data distribution process will be described below.

Next, in a case where a validity acknowledgement request signal is received from the display apparatus 20, the management server 10 executes a validity acknowledgement process (Yes in step S1018→Step S1020). Here, the validity acknowledgement request signal is a signal transmitted to the management server 10 for acknowledgement validity of the signage data (contents display schedule and contents data) displayed on the display apparatus 20. Operation of the validity acknowledgement process will be described below.

1.3.2. Signage Data Storage Process

Figure 10:
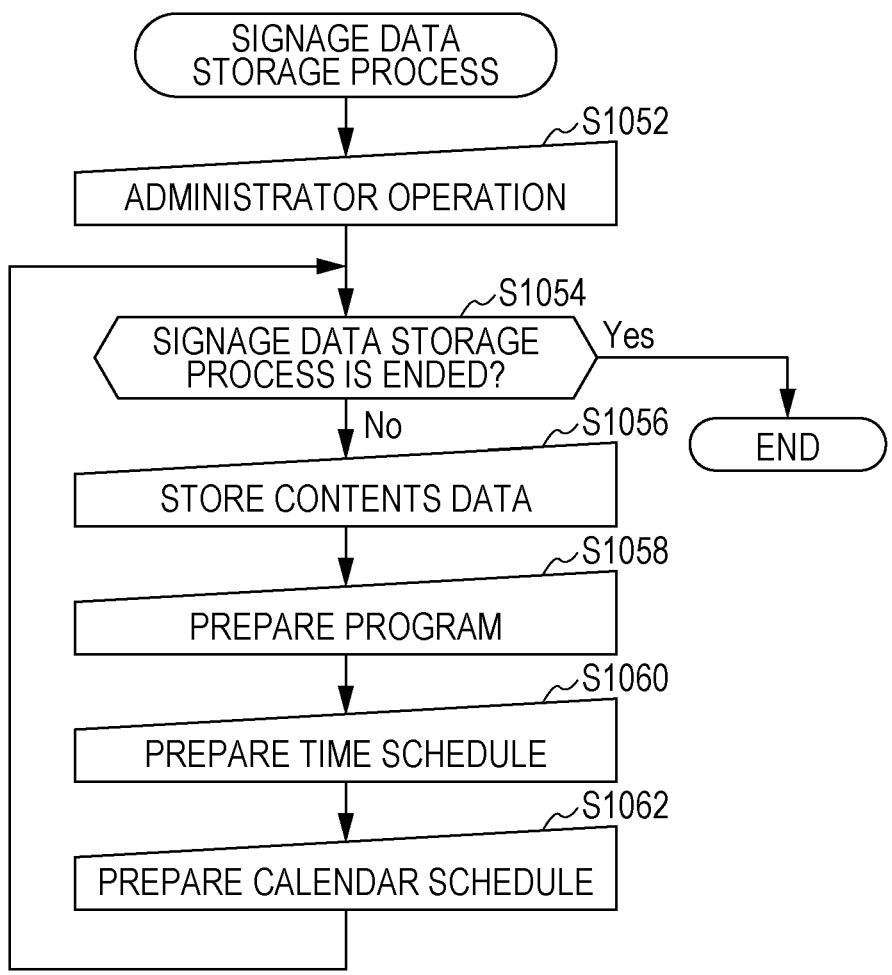
FIG. 10 is an operation flow for explaining a signage data storage process according to the first embodiment.

Next, the signage data storage process will be described with reference to FIG. 10.

First, when the operation of the administrator is performed (Step S1052), it is determined whether or not the operation is the end operation of the signage data storage process (Step S1054). The end operation of the signage data storage process is operation of ending a function which stores the signage data. In a case of the end operation of the signage data storage process, the process is end (Yes in Step S1054).

Next, the contents data is stored (Step S1056). In detail, contents data prepared in advance is stored in the signage data storage region 142 as the contents data 1422. The contents data prepared in advance may be, for example, contents data stored in another storage medium prepared by the administrator. In addition, when the contents data is stored in the signage data storage region 142, a hash value of the contents data may be calculated and the calculated hash value is stored in the contents data hash value table 1442 in association with a contents name.

Next, the program is prepared (Step S1058). The program name, the display frames displayed in the program, and the contents displayed on each of the display frames are designated to prepare the program. The prepared program is stored in the program table 1420c. In addition, when the program is stored in the program table 1420c, a hash value of the program may be calculated and the calculated hash value is stored in the program hash value table 1440c in association with the program name.

Next, the time schedule is prepared (Step S1060). The time schedule name, the time zone, and the program name assigned to the time zone are designated to prepare the time schedule. The prepared time schedule is stored in the time schedule table 1420b. In addition, when the time schedule is stored in the time schedule table 1420b, a hash value of the time schedule may be calculated and the calculated hash value is stored in the time schedule hash value table 1440b in association with the time schedule name.

Next, the calendar schedule is prepared (Step S1062). The display apparatus ID, the date, and the time schedule name assigned to the date are designated to prepare the calendar schedule. The prepared calendar schedule is stored in the calendar schedule table 1420a. In addition, when the calendar schedule is stored in the calendar schedule table 1420a, a hash value of the calendar schedule may be calculated and the calculated hash value is stored in the calendar schedule hash value table 1440a in association with the display apparatus ID and the date.

1.3.3. Undistributed Data Distributing Process

Next, the undistributed data distribution process will be described with reference to FIG. 11.

First, it is determined whether or not the alternative contents data storage region 248 of the display apparatus 20 which is a distribution destination of the undistributed data is ROMized (Step S1102). In order to determine whether or not the alternative contents data storage region 248 is ROMized, for example, the management server 10 stores information on whether or not the alternative contents data storage region 248 of the display apparatus 20 which a management target is a ROM and the information on the display apparatus 20 of the distribution destination is read or a signal of checking a configuration of the alternative contents data storage region 248 of the display apparatus 20 is transmitted and the signal is used.

In a case where the alternative contents data storage region 248 of the display apparatus 20 which is the distribution destination is not ROMized, it is determined whether or not undistributed alternative contents data among the alternative contents data stored in the alternative contents data storage region 148 of the management server 10 exists (Yes in Step S1102→Step S1104). In a case where the undistributed alternative contents data exists, the undistributed alternative contents data is distributed to the display apparatus 20 (Yes in Step S1104→Step S1106).

Next, it is determined whether or not distributed signage data among the signage data (contents display schedule and contents data) stored in the signage data storage region 142 of the management server 10 exists (Yes in Step S1108). In a case where the undistributed signage data exists, the undistributed signage data is distributed to the display apparatus 20 (Yes in Step S1108→Step S1110).

Next, it is determined whether or not the process described above is performed on all of the display apparatuses 20 which the management server 10 manages (Step S1112). In a case where the management server 10 performs the process described above on all of the display apparatuses 20 which are the management targets, the undistributed data distribution process is ended. In other cases, in the same manner, the process described above is performed on the display apparatus 20 on which the process described above is not performed.

1.3.4. Validity Acknowledgement Process

Next, the validity acknowledgement process will be described with reference to FIG. 12.

In the validity acknowledgement process, the validity acknowledgement request signal is received from the display apparatus 20 and executed. The validity acknowledgement request signal transmitted from the display apparatus 20 includes one or a plurality of identifiers which identify data which is a validity acknowledgement target and hash values of the data specified by the identifier. Here, the identifier which identifies data identifies one of a terminal apparatus ID, the date, the time schedule name, the program name, and the contents name. In addition, the terminal apparatus ID and the date specify the calendar schedule, the time schedule name specifies the time schedule, the program name specifies the program, and the contents name specifies the contents data.

First, an identifier and a hash value (first hash value) of the data identified by the identifier are extracted from the validity acknowledgement request signal (Step S1152).

Next, based on the extracted identifier, a record equal to the identifier is specified from the hash value storage region 144 and a hash value (second hash value) is read (Step S1154). Here, by specifying the data specified by the identifier, for example, if the identifier is the contents name, the record equal to the identifier extracted from the contents data hash value table 1442 is specified and the hash value included in the record is read.

Next, it is determined whether or not the first hash value extracted from two of the hash value and the validity acknowledgement request signal is equal to the second hash value read from the hash value storage region 144 (Step S1156).

In a case where the first hash value is equal to the second hash value, validity of the data specified by the identifier extracted from the validity acknowledgement request signal is acknowledged. In this case, a validity acknowledgement result of the data is set to "reproduction permission" (Yes in Step S1156→Step S1158).

On the other hand, in a case where the first hash value is not equal to the second hash value, the validity of the data specified by the identifier extracted from the validity acknowledgement request signal is not acknowledged. In this case, the validity acknowledgement result of the data is set to "reproduction no-permission" (No in Step S1156→Step S1160).

Next, it is determined whether or not the process described above is performed on all of the extracted identifiers and hash values included in the validity acknowledgement request signal (Step S1162). In a case where it is determined that the process described above is not performed on all of the hash values included in the validity acknowledgement request signal (No in Step S1162), the process is returned to Step S1152.

In a case where all of the hash values included in the validity acknowledgement request signal are extracted (Yes in Step S1162), a validity acknowledgement response signal including the validity acknowledgement result is transmitted to the display apparatus 20 which transmits the validity acknowledgement request signal (Step S1164).

A transmission source of the display apparatus 20 may be specified by using, for example, an address (for example, IP address, MAC address, or the like) of the transmission source of the validity acknowledgement request signal or the display apparatus ID included in the validity acknowledgement response signal.

In the validity acknowledgement process, the data transmitted and received between the management server 10 and the display apparatus 20 can be any format as long as the format can represent information desired for validity acknowledgement.

Here, FIGS. 13A and 13B illustrate examples in which the data transmitted and received is represented in an XML format. FIG. 13A is a diagram illustrating data included in the validity acknowledgement request signal. In this XML, elements of a program tag represents the hash value of the program and elements of a content tag represents the hash value of the contents data. In addition, a name properties is assigned to the program tag and the content tag and the identifier specifying the data is described as a properties value of the name properties.

FIG. 13B is a diagram illustrating data included in the validity acknowledgement response signal. Although the data also has the program tag and the content tag, unlike FIG. 13A, each of elements represents the validity acknowledgement result. An eighth line of FIG. 13B represents that contents data having a content name of CM1-PIC2.JPG has reproduction no-permission (invalid). Therefore, according to a signage display process described below, when the program of "travel CM1" is displayed, the display apparatus 20 displays the alternative contents data instead of CM1-PIC2.JPG.

1.3.5. Signage Display Process

Figure 14:
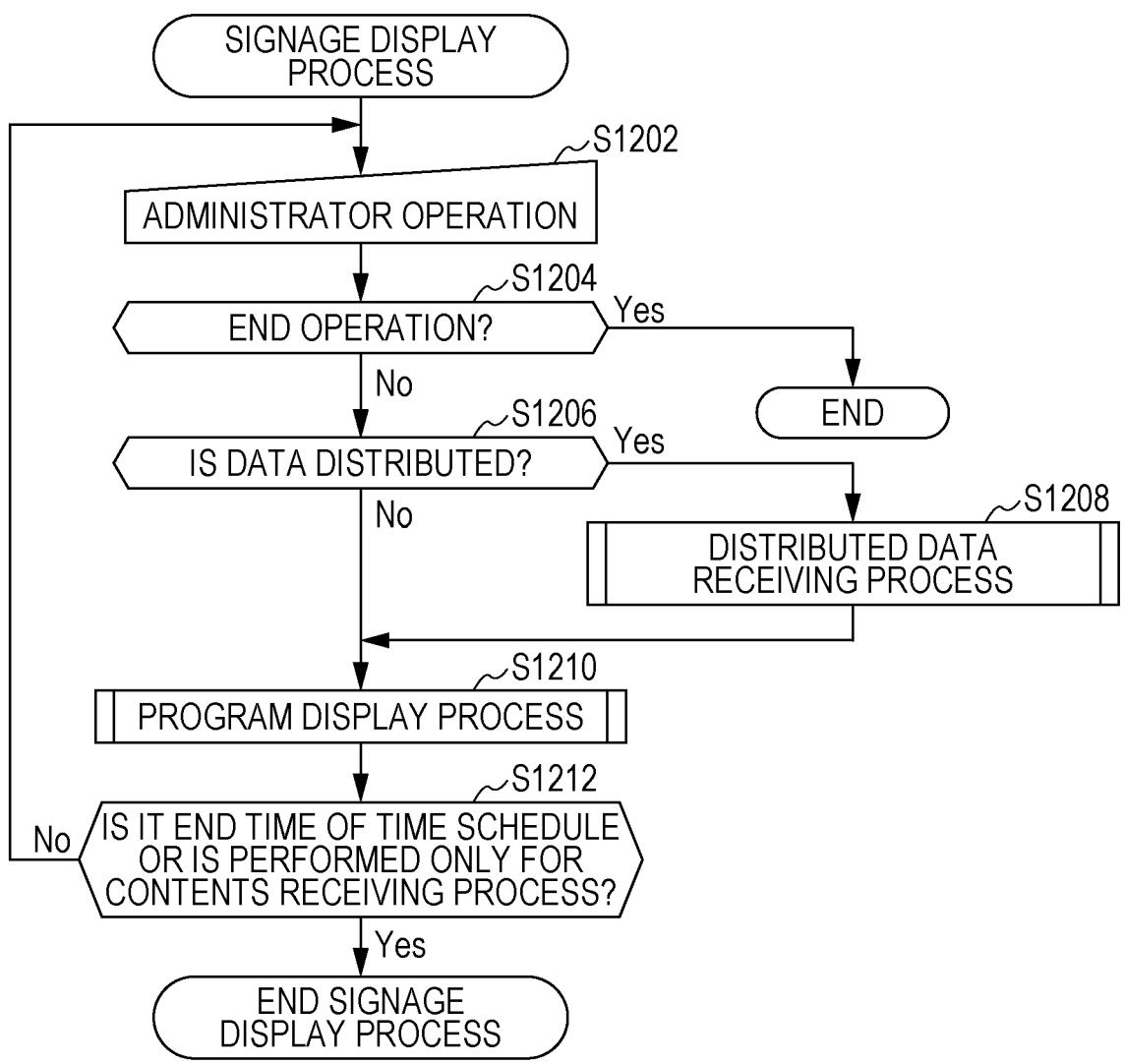
FIG. 14 is an operation flow for explaining a signage display process according to the first embodiment.

Next, the signage display process will be described with reference to FIG. 14. The signage display process is realized by the controller 210 reading the signage display program 250 from the storage unit 240 and executing the signage display program 250.

First, when the operation of the administrator is performed (Step S1202), it is determined whether or not the operation is the end operation of the signage display process (Step S1204). The end operation of the signage display process is operation of ending a function which performs the signage display process. In a case of the end operation of the signage display process, the process is end (Yes in Step S1204).

Next, it is determined whether or not data distributed from the management server 10 exists (Step S1206). If the signage data distributed from the management server 10 exists, a distributed data receiving process is performed (Yes in Step S1206→Step S1208). The distributed data receiving process will be described below.

Next, along the contents display schedule 2420, a program display process of displaying the program on the display apparatus 20 (Step S1210). The program display process will be described below.

Next, it is determined whether or not it is end time of the schedule defined in the contents display schedule 2420 or a contents display process is performed only for a contents receiving process (Step S1212). If the condition is satisfied, the present process is ended (Yes in Step S1212). In other cases, the signage display process continues (No in Step S1212).

1.3.6. Distributed Data Receiving Process

Figure 15:
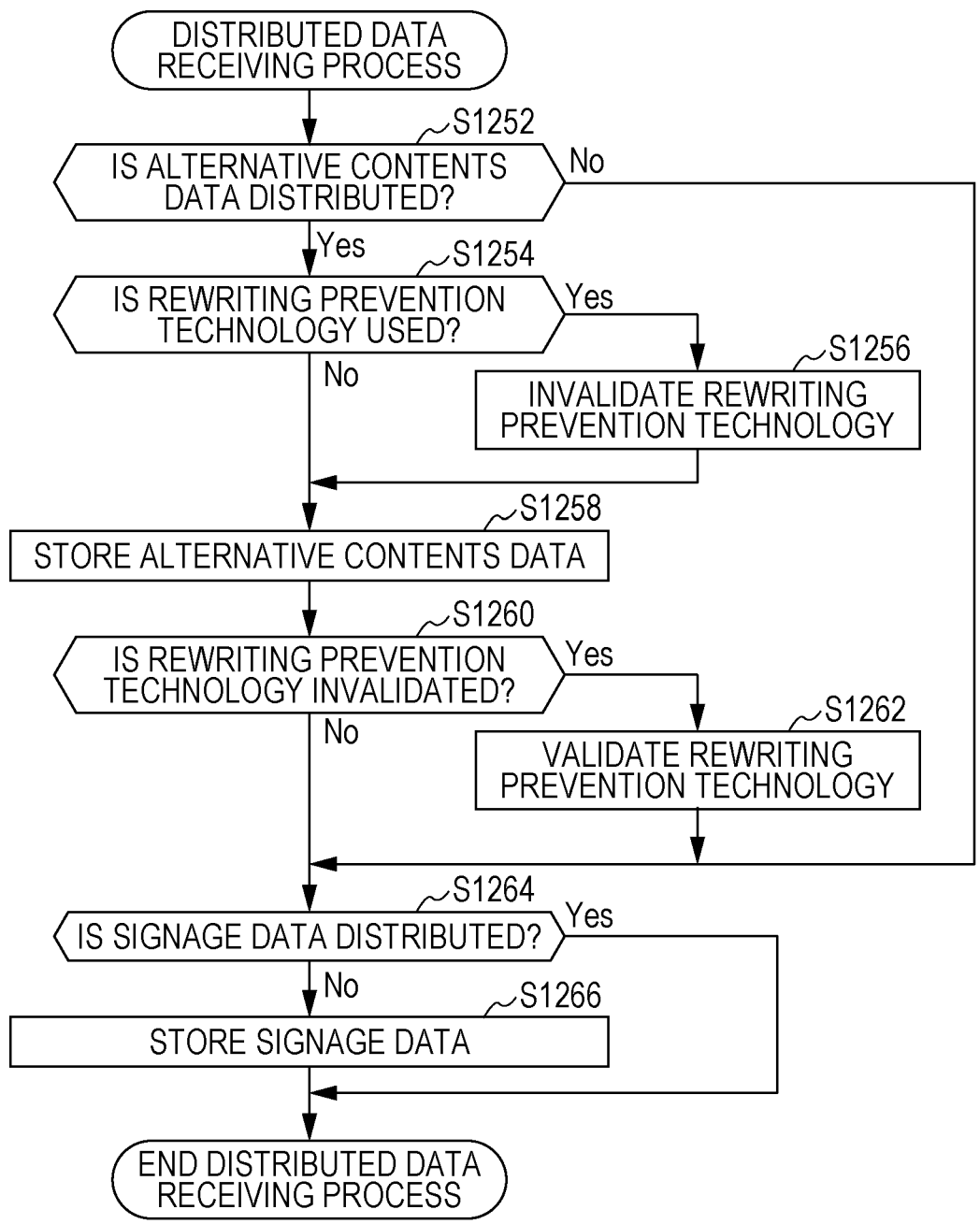
FIG. 15 is an operation flow for explaining a distributed data receiving process according to the first embodiment.

Next, the distributed data receiving process will be described with reference to FIG. 15.

First, the display apparatus 20 determines whether or not the alternative contents data is distributed from the management server 10 (Step S1252). In a case where the alternative contents data is distributed (Yes in Step S1252), the display apparatus 20 determines whether or not a rewriting avoidance technology is used (Step S1254). In a case where the rewriting avoidance technology is used, the display apparatus 20 temporarily invalidates the rewriting avoidance technology (Yes in Step S1254→Step S1256).

As the rewriting avoidance technology, for example, a technology of a virtual ROMization of a storage medium for rewriting avoidance or a known technology such as an enhanced write filter (EWF) and a file-based writer filter (FBWF) is used.

Next, the alternative contents data distributed from the management server 10 is stored in the alternative contents data storage region 248 (Step S1258).

Next, in a case where the rewriting avoidance technology is invalidated (Yes in Step S1260), the rewriting avoidance technology is validated again (Step S1262). Accordingly, it is possible to avoid rewriting of the alternative contents data stored in the alternative contents data storage region 248.

Next, it is determined whether or not the signage data is distributed (Step S1264). In a case where the signage data is distributed (Yes in Step S1264), the distributed signage data is received and the signage data is stored in the signage data storage region 242 (Step S1266).

In this way, in the present embodiment, it is possible to store the alternative contents data in the alternative contents data storage region 248 to which the rewriting avoidance technology can be applied. Therefore, even if a third party tries to rewrite the contents data with different contents data from the external IF unit 270, validity of the alternative contents data is warranted.

1.3.7. Program Display Process

Next, the program display process will be described with reference to FIG. 16.

First, with reference to the contents display schedule 2420, it is determined whether or not the program to be displayed next is assigned (Step S1302).

Specifically, current time, the calendar schedule stored in the calendar schedule table 2420a, and the time schedule stored in the time schedule table 2420b are compared with one another so that it is determined whether or not the program to be displayed next is assigned. In a case where the program to be displayed next is not assigned, the program display process is ended (No in Step S1302).

In a case where the program to be displayed next is assigned (Yes in Step S1302), a hash value of the program to be displayed next and a hash value of contents data displayed by the program to be displayed next are calculated (Step S1304). The hash value of the program and a program name are stored in the program hash value table 2460c in association with each other. In addition, the hash value of the contents data and a contents name are stored in the contents data hash value table 2462 in association with each other.

Next, the validity acknowledgement request signal having the calculated hash value is transmitted to the management server 10 (Step S1306). At this time, the validity acknowledgement request signal includes the calculated hash value, the contents name corresponding to the hash value, and the identifier which identifies the program.

In the present embodiment, the validity acknowledgement request signal is transmitted immediately before reproducing the program. As a time at which the program is reproduced, for example, the time may be set a prescribed backward time from a start time of the program, such as three minutes or five minutes before the start time of the program or may be dynamically determined in consideration of a turnaround time.

Next, in a case where the validity acknowledgement response signal is received from the management server 10 (Yes in Step S1308), the validity acknowledgement result included in the validity acknowledgement response signal and the following process is performed by the validity acknowledgement result (Step S1310).

In a case where the program to be displayed next and all of the validity acknowledgement results of the contents have reproduction permission, the next program is displayed on the display apparatus 20 at a start time of the next program (Yes in Step S1310→Step S1312). In other cases (No in Step S1310), according to whether or not which data does not have reproduction no-permission, the following process is performed. Specifically, it is determined whether or not the hash value (calculated hash value) corresponding to the identifier included in the validity acknowledgement request signal is equal to the hash value stored in the management server 10 so that the following process is performed.

In a case where the validity acknowledgement result corresponding to the identifier of the program has "reproduction no-permission", that is, in a case where validity of the program cannot be acknowledged (Yes in Step S1314), the program is changed to the alternative contents data in a time zone in which the program itself is displayed (Step S1316). As a changing method, it is conceivable that one display frame which is a region of an overall screen is set and the alternative content is displayed in predetermined order on the display frame from a start time to an end time of the original program. In addition, the program to be displayed inside the display frame may be changed to the alternative contents and the alternative contents may be displayed.

Next, in a case where the validity acknowledgement result corresponding to the identifier of the contents has "reproduction no-permission", that is, in a case where validity of some pieces of the contents data cannot be acknowledged (No in Step S1314), the contents data of which validity cannot be acknowledged is changed to the alternative contents data (Step S1318).

In this case, the contents data of which validity can be acknowledged is displayed as it is. Therefore, at a point of time, there may be a case where the contents data and the alternative contents data are mixedly displayed on the display apparatus 20.

In the present embodiment, the validity of the program and the contents data is acknowledged immediately before the program is reproduced, but the acknowledgement may be performed individually. That is, the validity of the program may be acknowledged immediately before the program is reproduced and the validity of the contents data may be acknowledged immediately before the contents data is displayed. As a time at which the contents data is displayed, for example, the time may be set a backward time from displaying the contents data, such as three minutes or five minutes or may be dynamically determined in consideration of a turnaround time.

By acknowledging the validity of the contents data immediately before the contents data is displayed, it can be expected that validity of the signage data is more warranted as compared with a case where the validity of the contents data is acknowledged immediately before the program is reproduced.

1.4. Operation Example

Figure 17A:
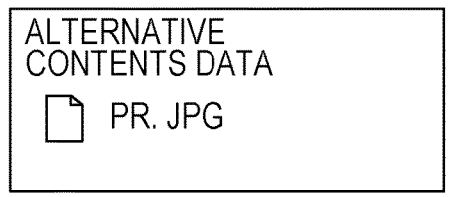
FIGS. 17A and 17B are diagrams for explaining operation examples of a contents display process according to the first embodiment.
Figure 17B:
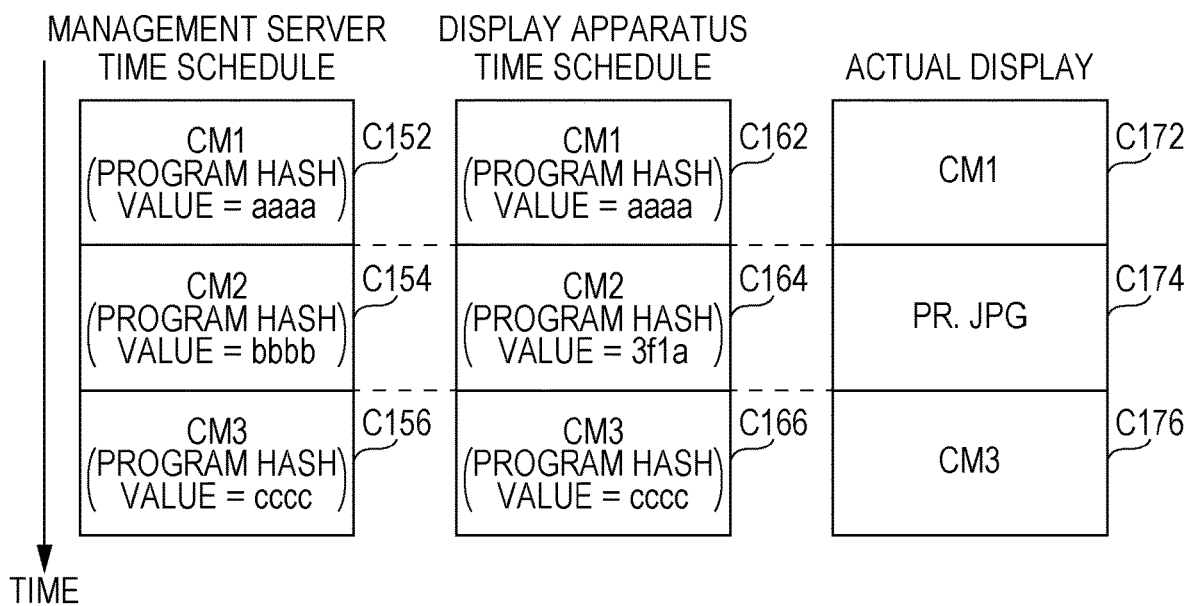

Next, operation examples according to the first embodiment will be described with reference to FIGS. 17A and 17B. FIG. 17A illustrates the alternative contents data of the display apparatus 20. In addition, FIG. 17B illustrates a part of the time schedule and the hash value (described as "program hash value" in FIG. 17B) of the assigned program is also illustrated. Among the time schedules, the time schedule illustrated under "management server" is the time schedule stored in the management server 10.

Here, the programs stored in the management server 10 is a program C152, a program C154, and a program C156. In addition, the programs (programs distributed from management server 10) stored in the display apparatus 20 is a program C162, a program C164, and a program C166.

Originally, the program stored in the management server 10 is the same as the program displayed on the display apparatus 20. Therefore, a hash value (hash value stored in management server 10) of the program of the program C152 is the same as a hash value (hash value calculated by display apparatus 20) of the program of the program C162.

Here, it is assumed that the program C164 is a program rewritten by the third party. At this time, the hash value of the program of the program C164 is different from the hash value of the program of the program C154. Therefore, before the program C164 is displayed, when the validity acknowledgement response signal is acknowledged, the validity acknowledgement result is set to "reproduction no-permission". Therefore, the program C164 is not displayed on the display apparatus 20 and the alternative contents data is displayed in the time zone of the program to be originally displayed.

As described above, the display apparatus 20 actually displays a program C174 of "actual display" in FIG. 17B. The alternative contents data is displayed from an end time of the program of CM1 to a start time of the program of CM3.

In the present embodiment, the validity of the program and the contents data is acknowledged, but by adding an identifier which acknowledges validity of the time schedule or the calendar schedule and a hash value of data designated by the identifier, it is possible to acknowledge the validity of the time schedule or the calendar schedule.

That is, in the signage data, it is possible to compare the hash value of the schedule included in the contents display schedule 2420 with the hash value stored in the management server 10. In this case, for example, in a case of the hash value based on the time schedule, the display apparatus 20 acknowledges the validity of the data at a prescribed timing (once a day at 9 AM).

In this way, according to the present embodiment, in a case where the display apparatus 20 displays the signage data, by using the validity acknowledgement information, it is possible to acknowledge whether or not the program and the contents to be displayed are distributed from the management server 10. In addition, the program and the contents included in the originally distributed signage data are stored, it is possible to perform the process of displaying the alternative contents.

In addition, even if the alternative content is stored in the rewritable region, there is a supremely low possibility of the alternative content being rewritten by the third party. As a result, it becomes possible to manage such that the content inappropriate for the administrator is not displayed on the display apparatus 20.

In addition, in the embodiment described above, tampering of the program and the contents data by the third party is described as an example, but the embodiment can also deal with corruption and omission of the data.

2. Second Embodiment

Next, the second embodiment will be described. A configuration of the second embodiment is the same as the configuration of the first embodiment, but in a case where validity of the signage data cannot be acknowledged on a management server 10 side, the signage data is redistributed in the second embodiment.

Figure 11:
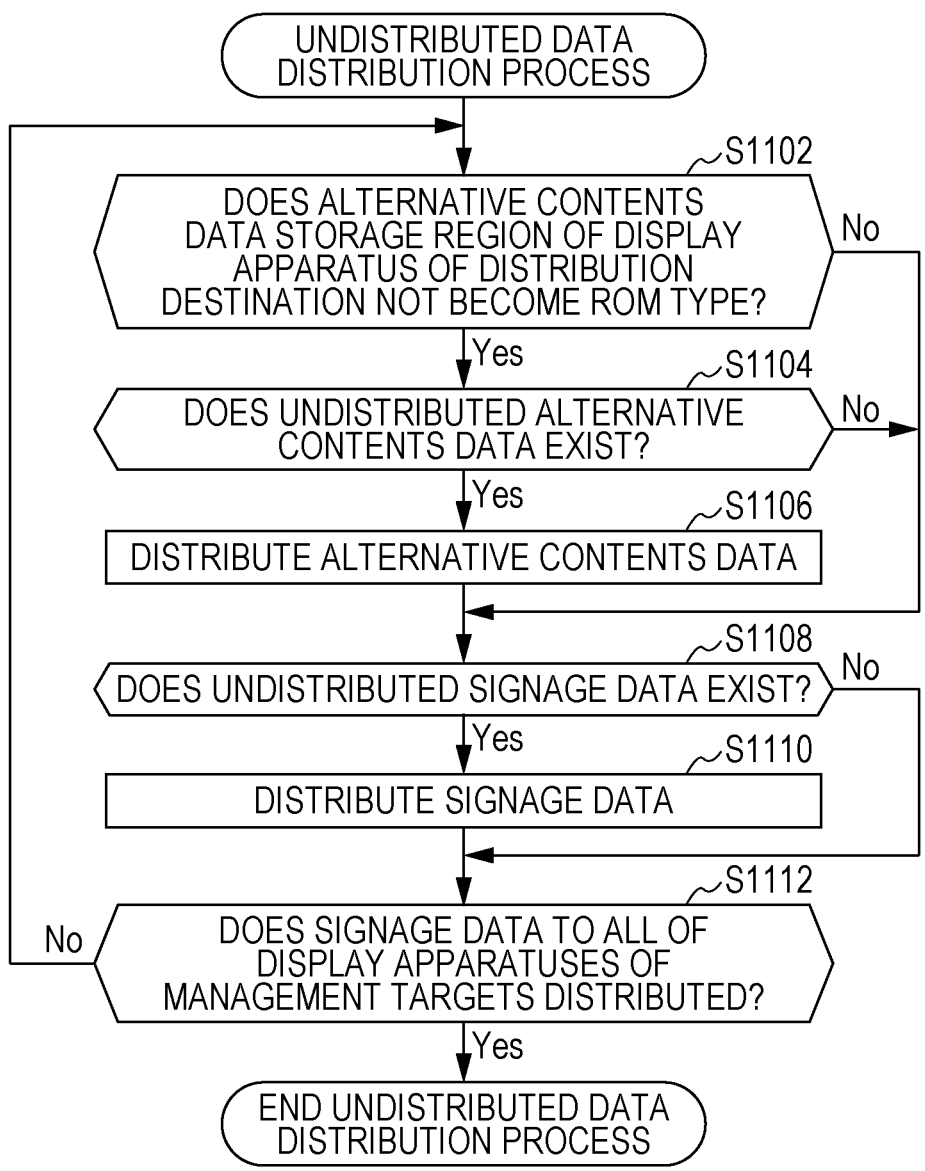
FIG. 11 is an operation flow for explaining an undistributed data distribution process according to the first embodiment.
Figure 12:
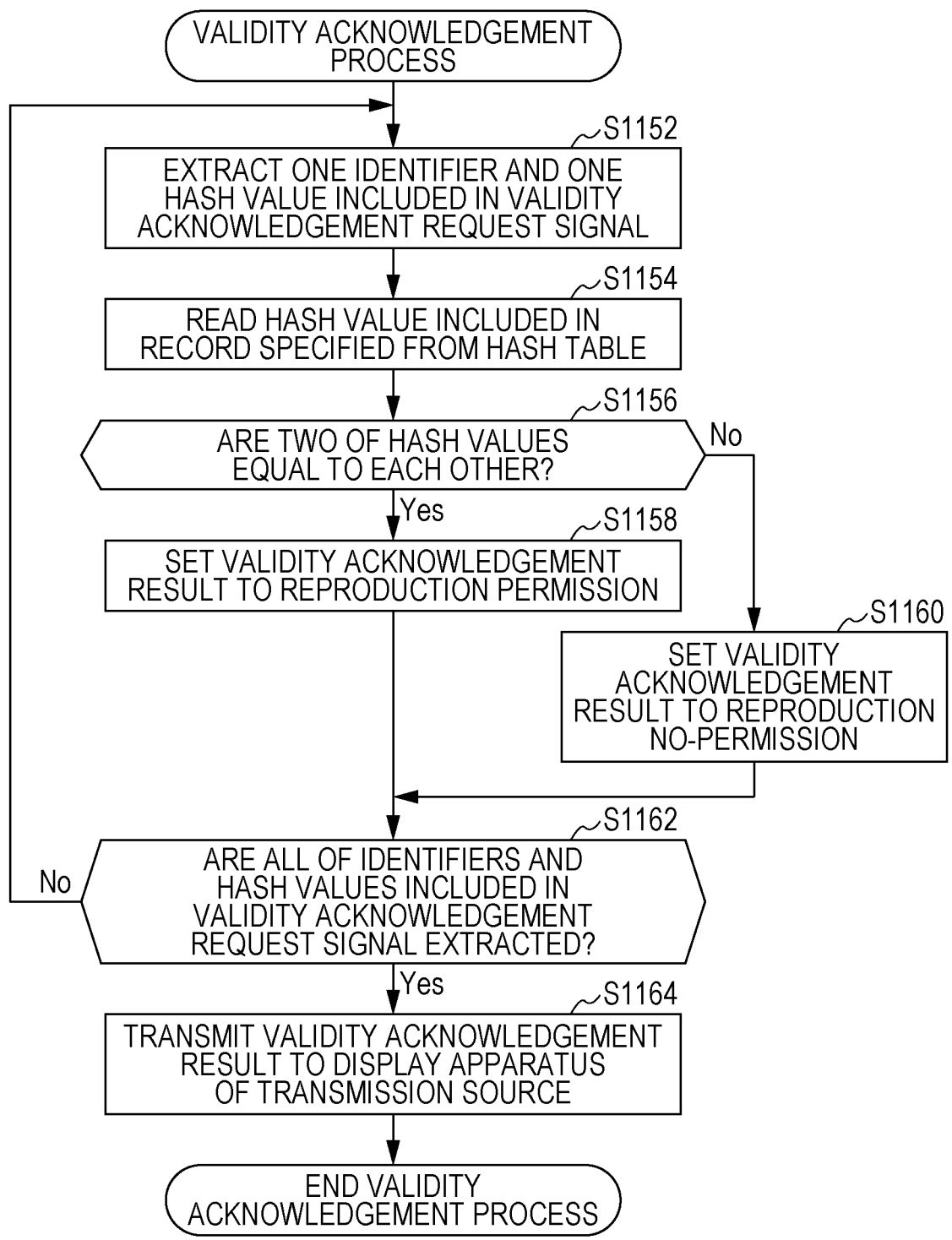
FIG. 12 is an operation flow for explaining a validity acknowledgement process according to the first embodiment.
Figure 18:
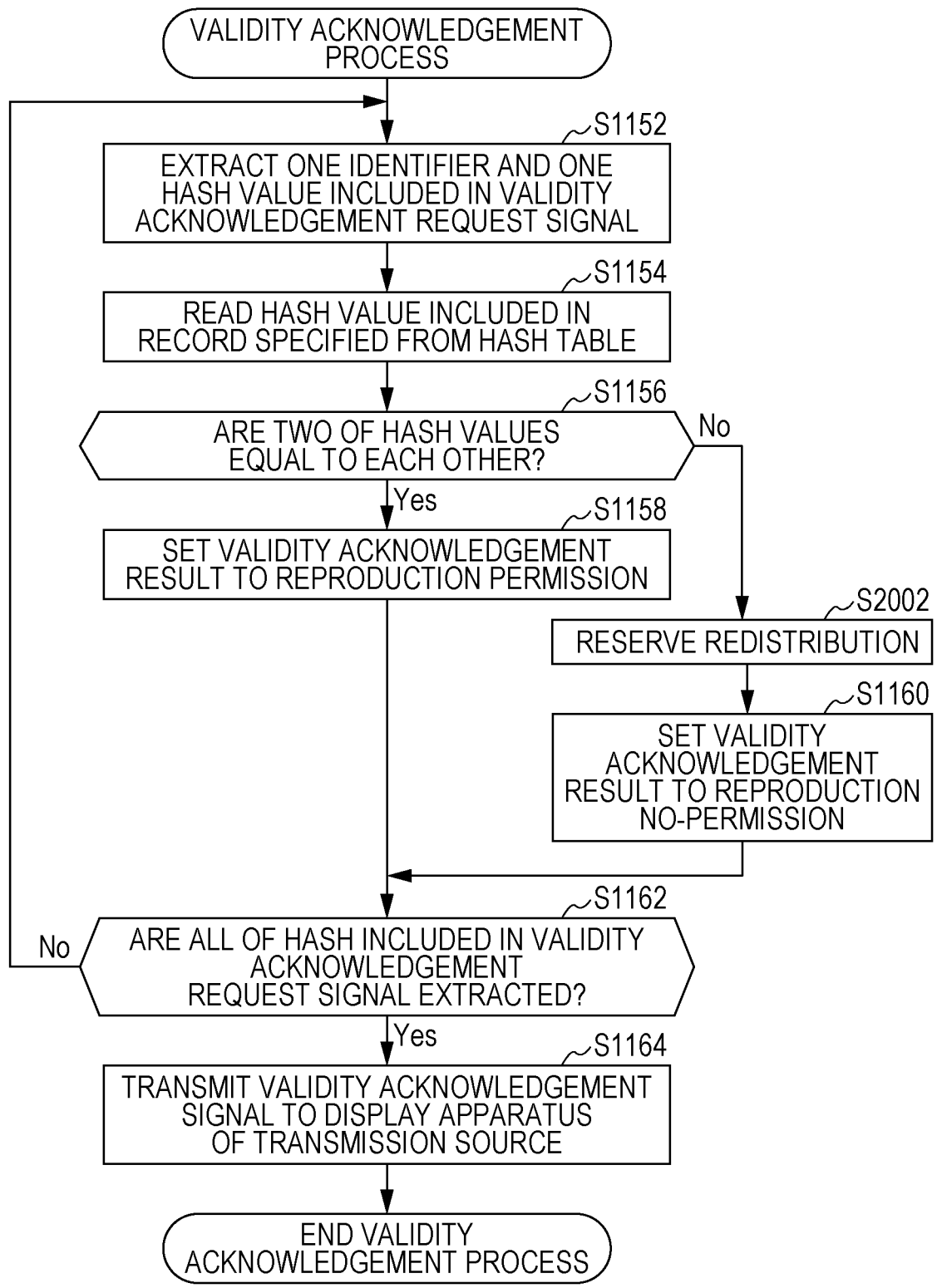
FIG. 18 is an operation flow for explaining a reproduction acknowledgement request process according to a second embodiment.
Figure 19:
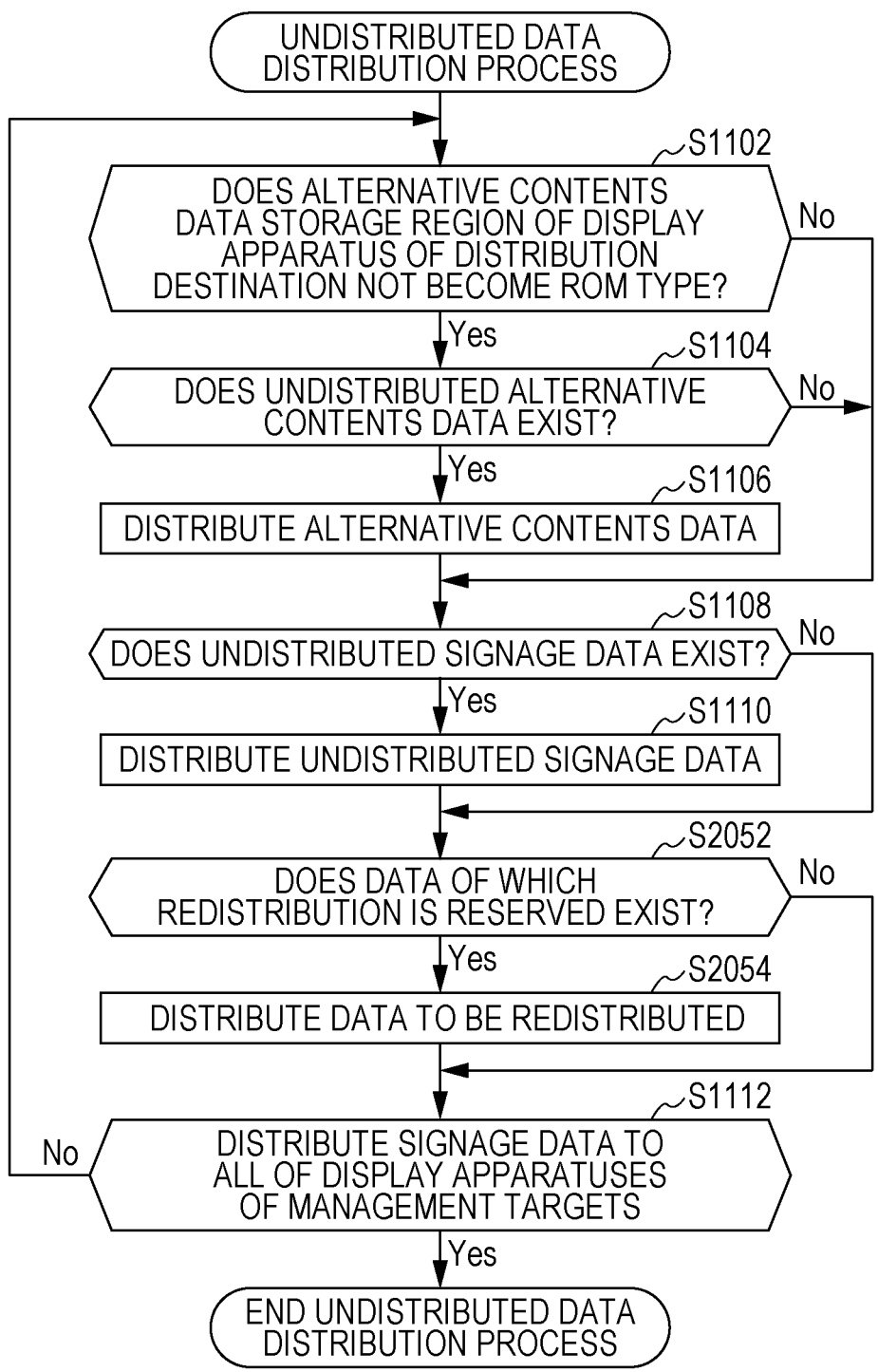
FIG. 19 is an operation flow for explaining an undistributed data distribution process according to the second embodiment.

In the present embodiment, the process of the first embodiment in FIG. 12 is substituted with a process in FIG. 18 and the process of the first embodiment in FIG. 11 is substituted with a process in FIG. 19 Here, since a functional configuration of the management server 10 and the display apparatus 20 according to the second embodiment is the same as the functional configuration of the management server 10 and the display apparatus 20 according to the first embodiment, a description of the functional configuration will be omitted. In addition, the same processes as those in FIGS. 11 and 12 are denoted by the same reference numerals and a detailed description thereof will be omitted.

In Step S1156 in FIG. 18, it is determined whether or not the hash value (that is, hash value calculated by display apparatus 20) extracted from the validity acknowledgement request signal is equal to the hash value (that is, hash value calculated by the management server 10) read from the hash value storage region 144. Here, in a case where the two hash values are equal to each other, redistribution of the data specified by the identifier extracted from the validity acknowledgement request signal is reserved (Step S2002).

Here, the data of which redistribution is reserved may be only the program or the contents data of which validity is not acknowledged and redistribution of the overall signage data may also be reserved. In addition, in a case of the contents data, redistribution of the contents data of which the validity is not acknowledged may be reserved. In a case of the contents schedule data, redistribution of the signage data may be reserved.

In a case where the redistribution is reserved, in the undistributed data distribution process in FIG. 19, it is determined whether or not the data (for example, signage data) of which redistribution is reserved exists. When the data exists (Yes in Step S2052), the data is redistributed from the management server 10 to the display apparatus 20 (Step S2054).

In other cases, for example, the management server 10 may also acknowledge whether or not redistribution is performed every predetermined time. In addition, a redistribution signal may be transmitted from the display apparatus 20 to the management server 10 and the redistribution may be executed each time as an interrupt process.

Accordingly, by transmitting the program or the contents data to be originally displayed to the display apparatus 20, it is possible to restore the data of which validity cannot be acknowledged. In this case, it is conceivable that there is a high possibility that all pieces of data have reproduction permission for the following validity acknowledgement requests to the same program. Accordingly, it can be expected that opportunities of displaying the alternative contents data are reduced and reliability of the display apparatus 20 is enhanced.

3. Third Embodiment

Next, the third embodiment will be described. A configuration of the third embodiment is the same as the configuration of the first embodiment, but in a case where the number of times the validity of the signage data cannot be acknowledged on a management server 10 side exceeds a prescribed number, a recovery process is performed on the display apparatus 20 of the transmission source to which the validity acknowledgement response signal is transmitted.

Figure 20:
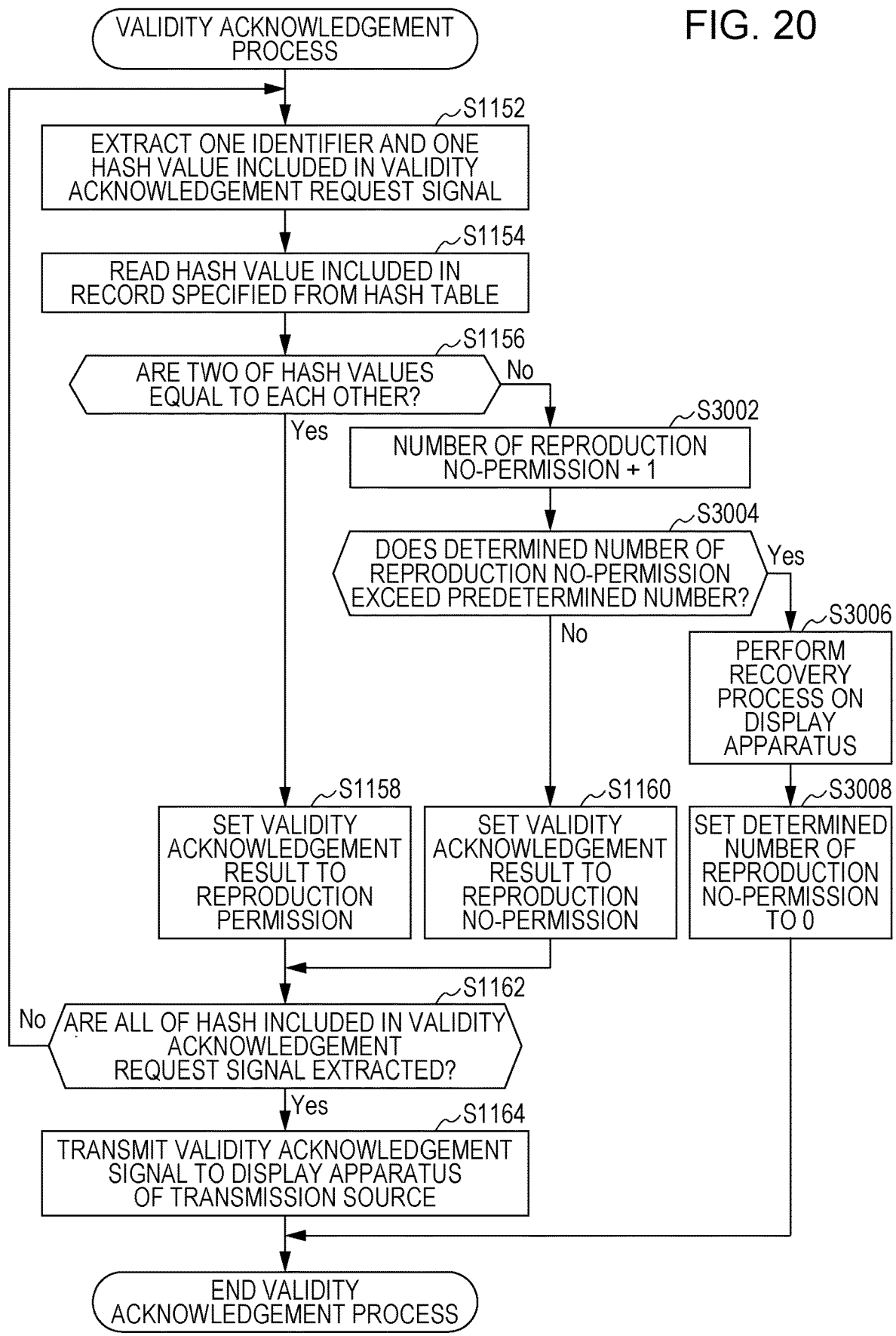
FIG. 20 is an operation flow for explaining a validity acknowledgement process according to a third embodiment.

In the present embodiment, the process of the first embodiment in FIG. 12 is substituted with a process in FIG. 20. Here, since a functional configuration of the management server 10 and the display apparatus 20 according to the third embodiment is the same as the functional configuration of the management server 10 and the display apparatus 20 according to the first embodiment, a description of the functional configuration will be omitted. In addition, the same process as the process in FIG. 12 is denoted by the same reference numerals and a detailed description thereof will be omitted.

In Step S1156 in FIG. 20, it is determined whether or not the hash value (first hash value) extracted from the validity acknowledgement request signal is equal to the hash value (second hash value) read from the hash value storage region 144. Here, in a case where the two hash values are not equal to each other, 1 is added to the number of times reproduction is not permitted indicating the number of times it is determined that reproduction in the display apparatus 20 which transmits the validity acknowledgement request signal is not permitted (Step S3002). For the number of times it is determined that reproduction is not permitted, for example, a table having a display apparatus ID and the number of times it is determined that reproduction is not permitted in the display apparatus 20 specified by the display apparatus ID in association with each other may be stored in the storage unit 140 of the management server 10.

Next, it is determined whether or not the number of times reproduction is not permitted exceeds the prescribed number (Step S3004). In a case where the number of times reproduction is not permitted is equal to or smaller than the prescribed number, the validity acknowledgement result is set to "reproduction no-permission" (No in Step S3004→Step S1160). In addition, the number of times reproduction is not permitted exceeds the prescribed number, the recovery process is performed on the display apparatus 20 having the number of times it is determined that reproduction is not permitted exceeding the prescribed number (Yes in Step S3004→Step S3006).

Here, the number of times it is determined that reproduction is not permitted is the number of times to determine whether or not to perform the recovery process. For example, the number of times may be a simple cumulative number such as 3 times or 4 times or may be a threshold value of the number of times reproduction is not permitted during a unit time (for example, 1 hour or the like). The embodiment is described by using the number of times, but the embodiment may be described by using an interval. For example, in a case where the two hash values are not equal to each other again within ten minutes after the two hash values are not equal to each other, Step S3006 may be executed.

In addition, as the recovery process, for example, it is conceivable that the management server 10 distributes all pieces of the signage data to be displayed by the display apparatus 20 to the display apparatus 20 which is a recovery target.

Next, if the recovery process is completed, the number of times reproduction is not permitted is returned to "0". Therefore, in a case where validity cannot be acknowledged thereafter, it is possible to avoid the recovery process from executing (Step S3008).

Accordingly, even if the validity of the signage data of the display apparatus 20 continues not to be acknowledged for reasons such as being rewritten on a large scale, by distributing all pieces of the signage data, it can be expected that the signage data is recovered and reliability of the display apparatus 20 is enhanced.

4. Fourth Embodiment

Next, the fourth embodiment will be described. In the fourth embodiment, the validity of the signage data to be reproduced on that day is acknowledged only once on that day. That is, a reference point of time at which the validity of the signage data is acknowledged is determined. When a time interval of 24 hours elapses, the validity of the signage data to be reproduced on that day is acknowledged. For example, if the validity of the signage data is to be acknowledged every day at 5 AM, a time as a reference point time at which the validity is acknowledged may be set to "5 AM".

Figure 16:
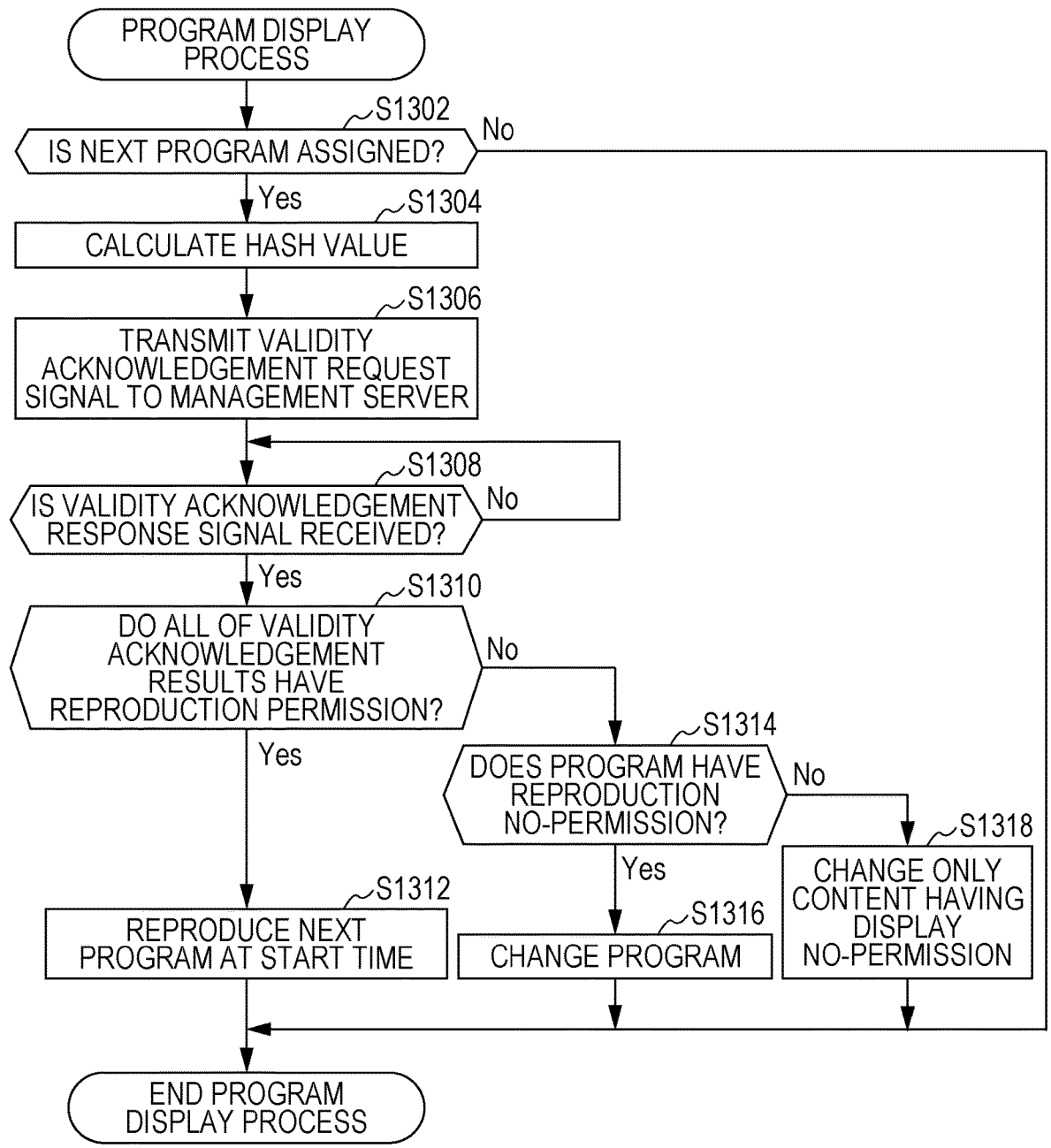
FIG. 16 is an operation flow for explaining a program display process according to the first embodiment.
Figure 21:
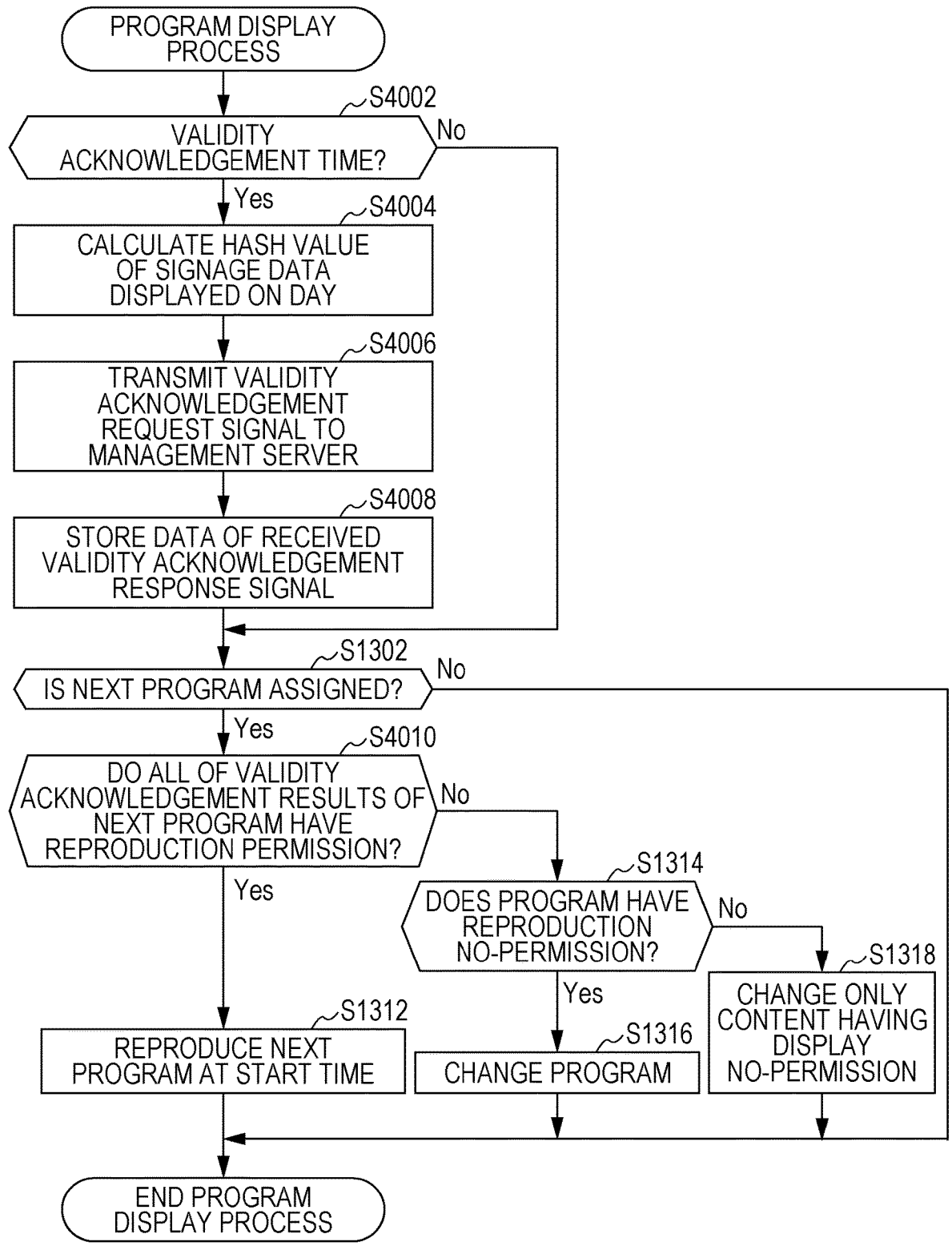
FIG. 21 is an operation flow for explaining a program display process according to a fourth embodiment.

In the present embodiment, the process of the first embodiment in FIG. 16 is substituted with a process in FIG. 21. Here, since a functional configuration of the management server 10 and the display apparatus 20 according to the fourth embodiment is the same as the functional configuration of the management server 10 and the display apparatus 20 according to the first embodiment, the same configuration as the configuration according to the first embodiment is denoted by the same reference numerals and a description thereof will be omitted. In addition, the same process as the process in FIG. 16 is denoted by the same reference numerals and a detailed description thereof will be omitted.

First, it is determined whether or not it is time to acknowledge the validity (Step S4002). The validity acknowledgement time means a time at which the validity is acknowledged and specifically means a time at which the validity is acknowledged for the first time after a time interval of 24 hours elapses from the reference point.

In a case where it is time to acknowledge the validity, a hash value of the signage displayed on that day is calculated (Yes in Step S4002→Step S4004). Here, the hash value of the signage displayed on that day may be calculated for all of the contents schedules and all pieces of the contents data and the hash value of the signage displayed on that day may be calculated only for all pieces of the contents data.

Next, the validity acknowledgement request signal having the calculated hash value and the identifier corresponding to the hash value is transmitted to the management server 10 (Step S4006). When the validity acknowledgement response signal is received from the management server 10, the validity acknowledgement result is stored (Step S4008). It is conceivable that a storage destination of the validity acknowledgement result is, for example, the storage unit 240. In addition, the validity acknowledgement result is desired to be stored until all of the programs to be reproduced on that day defined by the contents display schedule 2420 are reproduced.

Next, in a case where the next program is assigned (Step 1302), the stored validity acknowledgement result of the validity acknowledgement response signal is referred for the signage data desired to display the program. In a case where all of the validity acknowledgement results have reproduction permission, the next program is displayed at a start time of the next program (Yes in Step S4010→Step S1312). In a case where all of the validity acknowledgement result does not have "reproduction permission" (No in Step S4010→Step S1314), the signage data of which the validity cannot be acknowledged is changed to the alternative contents data and the program is reproduced. As a result, it is possible to omit the process of acknowledging the validity before the program is reproduced. In this case, when the plurality of the display apparatuses 20 are managed, even if timings at which the programs are changed are concentrated, it can be expected to avoid network congestion by the validity acknowledgement request signal and the validity acknowledgement response signal.

In the present embodiment, the validity of the signage data is acknowledged only once on that day, but the validity of the signage data may be acknowledged two times or more times on that day. Specifically, a time interval of acknowledging the validity of the signage data may be set to 12 hours. In a case where the validity is to be acknowledged more frequently, the time interval may be set to 3 hours or 6 hours. In addition, without providing the reference point time, after a prescribed time interval (for example, one hour) elapses after power is supplied to the display apparatus 20, the validity of the signage data may be acknowledged.

In addition, in a case where the time interval between the signage data validity acknowledgements is shorter than 24 hours, the signage data of which the hash value is calculated in Step S4004 may be limited to the signage data reproduced until the next validity acknowledgement time.

5. Fifth Embodiment

Next, the fifth embodiment will be described. In the fifth embodiment, as the validity acknowledgement information, other than the hash value of the signage data is used.

That is, it is conceivable that a file size is used instead of the hash value as information on the validity acknowledgement. For example, by comparing a data size of the contents display schedule stored in the management server 10 with a data size (for example, file size) of the contents display schedule 2420 stored in the display apparatus 20, it is possible to acknowledge validity of the data in the display apparatus 20.

In addition, for the contents data, by comparing a file size of the contents data stored in the management server 10 with a data file of the contents data stored in the display apparatus 20, it is possible to acknowledge validity of the contents data.

That is, in a case where the file sizes are different from each other, the management server 10 determines that the validity is not acknowledged and sets the validity acknowledgement result to "reproduction no-permission". In addition, in a case where the file sizes are equal to each other, the management server 10 determines that the validity is acknowledged and sets the validity acknowledgement result to "reproduction permission".

The validity acknowledgement information may be information for acknowledging whether or not the signage data (contents display schedule and contents data) of the management server 10 and the signage data of the display apparatus 20 are equal to each other. For example, the information may be identification information such as a time stamp (date) of a file ID, attached rights information, or the like. In addition, these pieces of the information may be used in combination with one another.

6. Effect

According to each of the embodiments described above, even if the third party tampers with the signage data and the unintended signage data is stored in the contents display apparatus, the program is not displayed based on the tampered signage data. The alternative contents data is displayed instead of the tampered signage data. In addition to not displaying the tampered content, it is also possible to avoid a so-called broadcasting accident situation. Accordingly, it is possible to have reliability as advertising equipment.

In addition, since it can be verified that the signage data is certainly distributed from the contents management apparatus to the contents display apparatus by acknowledging the validity of the signage data before the signage data is displayed, it is possible to improve operational accuracy.

In addition, since the administrator does not monitor by visual observation whether or not the signage data is correctly displayed and whether or not the signage data is correctly displayed can be automatically acknowledged, it can be expected that a burden of the administrator is reduced.

7. Modification Example

The present embodiments are described above with reference to the drawings, but a specific configuration is not limited to the embodiments and can be implemented in various modes without departing from a gist thereof.

In addition, in the embodiment described above, the display apparatus includes each of the functional units, but there may be provided a system which displays the contents data on the display apparatus connected to a display control apparatus via HDMI (registered trademark) or the like. In this case, the display control apparatus is configured to include the signage data or the hash value and to display the contents data on one or the plurality of the display apparatuses.

In addition, in the embodiment described above, the hash value calculated by the display apparatus 20 and stored in the display data hash value storage region 246, but the hash value may be temporally stored. That is, the hash value of the contents display schedule and the hash value of the contents data may be calculated and may be transmitted to the management server 10 as it is.

In addition, the embodiments described above may be executed in combination with one another. For example, by executing the first embodiment, the second embodiment, and the third embodiment in combination with one another, it can be expected that cases where the alternative contents data is displayed are reduced.

In addition, in the embodiment, the program operated in each of the units is a program (program which causes a computer to function) which controls CPU or the like to realize functions of the embodiment described above. The information used by these units is temporarily stored in a temporary storage apparatus (for example, RAM) during the process, thereafter is stored in a storage apparatus such as an HDD or a solid state drive (SSD), and as occasion, the CPU is read and correction and writing are performed.

In addition, in a case of distributing the program to a market, the program can be stored in a portable recording medium and distributed or can be transferred to a server computer connected via a network such as the internet. In this case, the present embodiment also includes the storage apparatus of the server computer.

The present disclosure contains subject matter related to that disclosed in Japanese Priority Patent Application JP 2017-080650 filed in the Japan Patent Office on Apr. 14, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A contents display apparatus that receives signage data including contents from a contents management apparatus, the contents display apparatus comprising:
   an alternative contents storage that receives alternative contents from the contents management apparatus and stores the alternative contents;

acknowledgement circuitry that causes the contents management apparatus to acknowledge validity of the signage data; and a contents display that displays contents based on the signage data, wherein the acknowledgement circuitry:
generates validity acknowledgement information from the signage data, transmits a validity acknowledgement request signal including the validity acknowledgement information to the contents management apparatus to cause the contents management apparatus to acknowledge the validity of the signage data, and receives a validity acknowledgement response signal including an acknowledgement result of the validity from the contents management apparatus, and the contents display displays contents of the signage data in a case where the validity acknowledgement response signal received by the acknowledgement circuitry indicates the validity of the signage data and displays the alternative contents stored in the alternative contents storage in other cases.

2. The contents display apparatus according to claim 1, wherein the validity acknowledgement information is one of a hash value, a data size, or a time stamp of the signage data.

3. The contents display apparatus according to claim 1, wherein the signage data includes contents data and a contents display schedule.

4. The contents display apparatus according to claim 3, wherein the contents display schedule is set to prescribed time zones and one or a plurality of the contents are included in each of the set time zones.

5. The contents display apparatus according to claim 1, wherein the acknowledgement circuitry causes the contents management apparatus to acknowledge the validity of the signage data at a validity acknowledgement time determined in advance.

6. The contents display apparatus according to claim 5, wherein the validity acknowledgement time is set to a point of time when a prescribed time interval elapses.

7. The contents display apparatus according to claim 1, wherein the acknowledgement circuitry causes the contents management apparatus to acknowledge the validity of the signage data immediately before the content is displayed.

8. The contents display apparatus according to claim 4, wherein the acknowledgement circuitry causes the contents management apparatus to acknowledge the validity of the signage data immediately before the time zone.

9. The contents display apparatus according to claim 1, further comprising:

a signage data storage that stores the signage data received from the contents management apparatus, wherein the signage data is stored in a region different from a region in which the alternative contents are stored.

10. A contents display method of a contents display apparatus that receives signage data including contents from a contents management apparatus, the contents display method comprising:

receiving alternative contents from the contents management apparatus and storing the alternative contents;

generating validity acknowledgement information from the signage data;

transmitting a validity acknowledgement request signal including the validity acknowledgement information to the contents management apparatus to cause the contents management apparatus to acknowledge validity of the signage data;

receiving a validity acknowledgement response signal including an acknowledgement result of the validity acknowledged by the contents management apparatus; and displaying contents of the signage data in a case where the validity acknowledgement response signal received by acknowledgement circuitry indicates the validity of the signage data and displaying the alternative contents stored in an alternative contents storage in other cases.

11. A contents display system that includes a contents display apparatus that receives signage data including contents from a contents management apparatus, wherein the contents display apparatus:

receives alternative contents from the contents management apparatus and stores the alternative contents;

generates validity acknowledgement information from the signage data;

transmits a validity acknowledgement request signal including the validity acknowledgement information to the contents management apparatus to cause the contents management apparatus to acknowledge validity of the signage data;

receives a validity acknowledgement response signal including an acknowledgement result of the validity acknowledged by the contents management apparatus; and displays contents of the signage data in a case where the validity acknowledgement response signal received by acknowledgement circuitry indicates the validity of the signage data and displays the alternative contents in other cases.

* * * * *